(12) United States Patent
Amano et al.

(10) Patent No.: US 7,491,758 B2
(45) Date of Patent: Feb. 17, 2009

(54) PRESSURE-SENSITIVE ADHESIVE COMPOSITION, PRESSURE-SENSITIVE ADHESIVE SHEET AND SURFACE PROTECTING FILM

(75) Inventors: Tatsumi Amano, Ibaraki (JP); Natsuki Kobayashi, Ibaraki (JP); Masahiko Ando, Ibaraki (JP); Kazuhito Okumura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 24 days.

(21) Appl. No.: 11/141,590

(22) Filed: May 31, 2005

(65) Prior Publication Data

US 2005/0266238 A1   Dec. 1, 2005

(30) Foreign Application Priority Data

| Jun. 1, 2004 | (JP) | 2004-163347 |
| Jul. 16, 2004 | (JP) | 2004-210332 |
| Mar. 14, 2005 | (JP) | 2005-070742 |
| Apr. 27, 2005 | (JP) | 2005-129382 |

(51) Int. Cl.
*C08K 5/34* (2006.01)
*C08L 33/06* (2006.01)

(52) U.S. Cl. .................. 524/99; 524/104; 524/95; 524/106; 524/272; 524/560; 428/343; 528/392; 528/492

(58) Field of Classification Search .............. 524/99, 524/104, 95, 106, 272, 560; 428/343; 528/392, 528/492
See application file for complete search history.

(56) References Cited

U.S. PATENT DOCUMENTS

| 3,492,276 | A | 1/1970 | Smith |
| 4,145,327 | A * | 3/1979 | Dolch et al. ............. 524/217 |
| 5,183,841 | A * | 2/1993 | Bernard .................... 524/272 |
| 5,433,892 | A * | 7/1995 | Czech ....................... 252/500 |
| 5,631,079 | A | 5/1997 | Gutman et al. |
| 5,885,678 | A | 3/1999 | Malhotra |
| 5,952,398 | A | 9/1999 | Dietz et al. |
| 6,028,132 | A | 2/2000 | Hayashi |
| 6,103,316 | A | 8/2000 | Tran et al. |
| 6,245,847 | B1 * | 6/2001 | Green et al. .............. 524/418 |
| 6,372,829 | B1 | 4/2002 | Lamanna et al. |
| 6,407,788 | B1 | 6/2002 | Okumura et al. |
| 6,657,011 | B2 | 12/2003 | Lau et al. |
| 6,706,920 | B2 | 3/2004 | Lamanna et al. |
| 6,939,911 | B2 | 9/2005 | Tosaki et al. |
| 2001/0031835 | A1 | 10/2001 | Ohrui et al. |
| 2001/0041763 | A1 | 11/2001 | Suzuki et al. |
| 2002/0132111 | A1 | 9/2002 | Zhou et al. |
| 2002/0137825 | A1 | 9/2002 | Lamanna et al. |
| 2003/0114560 | A1 | 6/2003 | Yang et al. |
| 2004/0054041 | A1 * | 3/2004 | Schmidt ..................... 524/99 |
| 2005/0025903 | A1 | 2/2005 | Fink et al. |
| 2005/0080195 | A1 * | 4/2005 | Iwama ....................... 525/228 |
| 2005/0197450 | A1 | 9/2005 | Amano et al. |
| 2005/0244633 | A1 * | 11/2005 | Kobayashi et al. ...... 428/355 R |
| 2005/0256251 | A1 * | 11/2005 | Amano et al. ............. 524/505 |
| 2006/0024494 | A1 | 2/2006 | Amano et al. |
| 2006/0100323 | A1 | 5/2006 | Schmidt et al. |
| 2006/0188711 | A1 * | 8/2006 | Kishioka et al. ........... 428/343 |
| 2006/0207722 | A1 | 9/2006 | Amano et al. |
| 2007/0141329 | A1 | 6/2007 | Yang et al. |

FOREIGN PATENT DOCUMENTS

| EP | 0 435 080 | 7/1991 |
| EP | 0 873 986 | 10/1998 |
| EP | 1 102 108 | 5/2001 |
| EP | 1 548 750 | 6/2005 |
| EP | 1 582 573 | 10/2005 |
| EP | 1 591 506 | 11/2005 |
| EP | 1 595 929 | 11/2005 |
| GB | 2121061 A * | 12/1983 |
| JP | 59226076 A * | 12/1984 |
| JP | 61-138901 | 6/1986 |
| JP | 4-309585 | 11/1992 |
| JP | 5-009449 | 1/1993 |
| JP | 6-051121 | 2/1994 |
| JP | 6-128539 A | 5/1994 |
| JP | 9-157618 | 6/1997 |
| JP | 9-165460 A | 6/1997 |
| JP | 9-208910 | 8/1997 |
| JP | 10-231325 | 9/1998 |
| JP | 10-298539 | 11/1998 |
| JP | 11-256116 | 9/1999 |
| JP | 2000-129235 | 5/2000 |
| JP | 2001-209039 | 8/2001 |

(Continued)

OTHER PUBLICATIONS

Peter Wasserscheid, et al., Ionic Liquids-New "Solutions" for Transition Metal Catalysis, Angewandte Chemie. International Edition, Verlag Chemie. Weinheim, Germany, vol. 39, No. 21, Nov. 3, 2000.

(Continued)

*Primary Examiner*—Ling-Siu Choi
(74) *Attorney, Agent, or Firm*—Knobbe Martens Olson & Bear LLP

(57) ABSTRACT

The present invention provides a pressure-sensitive adhesive which can prevent electrification of a non-electrification-prevented adherend upon peeling, suppresses occurrence of peeling off even with time or via treatment under a high temperature, and is excellent in adhesion reliance, as well as an antistatic pressure-sensitive adhesive sheet, and surface protecting film using this. The pressure-sensitive adhesive composition of the present invention contains an ionic liquid, and a polymer having a glass transition temperature of Tg of 0° C. or lower as a base polymer, as well as an ethylene oxide group-containing compound and/or a surfactant.

14 Claims, 1 Drawing Sheet

FOREIGN PATENT DOCUMENTS

| | | |
|---|---|---|
| JP | 2001-318230 | 11/2001 |
| JP | 2002-022960 | 1/2002 |
| JP | 2002-544364 | 12/2002 |
| JP | 2003-511505 A | 3/2003 |
| JP | 2003-195044 | 7/2003 |
| JP | 2003-202722 A | 7/2003 |
| JP | 2003-268334 | 9/2003 |
| JP | 2003-342483 A | 12/2003 |
| JP | 2004-517185 | 6/2004 |
| JP | 2004-217931 A | 8/2004 |
| JP | 2004-287199 A | 10/2004 |
| JP | 2004-536940 | 12/2004 |
| JP | 2005-15524 | 1/2005 |
| JP | 2005-105228 | 4/2005 |
| WO | WO 97/08260 | 3/1997 |
| WO | WO 98/36005 | 8/1998 |
| WO | WO 00/69985 | 11/2000 |
| WO | WO 01/25326 A1 | 4/2001 |
| WO | WO 02/13980 | 2/2002 |
| WO | WO 03/011958 | 2/2003 |
| WO | WO 2003/068280 * | 8/2003 |
| WO | WO 03068280 | 8/2003 |
| WO | WO 2003/085050 | 10/2003 |
| WO | WO 03/099953 | 12/2003 |
| WO | WO 2004005391 | 1/2004 |
| WO | WO 2004/027788 | 4/2004 |
| WO | WO 2004/65523 | 8/2004 |

OTHER PUBLICATIONS

European Office Action issued on the related European Patent Application No. EP05016102.5, dated Apr. 16, 2007.
European Search Report issued on the related European Patent Application No. EP05016102.5, dated Dec. 29, 2005.
Partial European Search Report issued on the related European Patent Application No. EP050016102, dated Nov. 8, 2005.
File History of the related U.S. Appl. No. 11/188,561 as of Feb. 19, 2008.
File History of the related U.S. Appl. No. 11/358,808, for the period of Aug. 9, 2007-Feb. 19, 2008.
Brochure regarding "Functional Chemicals" published by Kyoeisha Chemical Co., Ltd., printed and published in May 2003, front page, pp. 11-12, 19-20 and back page.
European Office Action issued on the related European Patent Application No. EP05004925, dated Oct. 24, 2005.
European Search Report issued on the corresponding(067AUS)/related European Patent Application No. EP06111107, dated Jun. 27, 2006.
European Search Report issued on the related European Patent Application No. 05005660, dated Jun. 30, 2005.
European Search Report issued on the related European Patent Application No. 05020138, dated Nov. 28, 2005.
European Search Report issued on the related European Patent Application No. 05009331, dated Jul. 22, 2005.
European Search Report issued on the related European Patent Application No. 05004925, dated Aug. 19, 2005.
European Search Report issued on the related European Patent Application No. 05020102, dated Nov. 29, 2005.
European Search Report issued on the related European Patent Application No. 05010330, dated Sep. 19, 2005.
European Search Report issued in the related European Patent Application No. 05015766, dated Nov. 4, 2005.
European Search Report issued on the related European Patent Application No. 05016102, dated Nov. 8, 2005.
File History of the related U.S. Appl. No. 11/073,456, as of Mar. 6, 2008.
File History of the related U.S. Appl. No. 11/188,561, for the period of Feb. 28, 2008-Mar. 6, 2008.
File History of the related U.S. Appl. No. 11/375,963, as of Mar. 6, 2008.
File History of the related U.S. Appl. No. 11/914,939, as of Mar. 6, 2008.
File History of the related U.S. Appl. No. 12/065,652, as of Mar. 6, 2008.
Information Supplement filed on the related Japanese Patent Application No. 2005-26704, dated May 14, 2007.
International Search Report issued on the related PCT Application No. PCT/JP2006/309712, dated Jun. 20, 2006.
International Search Report issued on the related PCT Application No. PCT/JP2006/317522, dated Dec. 12, 2006.

* cited by examiner

PRESSURE-SENSITIVE ADHESIVE COMPOSITION, PRESSURE-SENSITIVE ADHESIVE SHEET AND SURFACE PROTECTING FILM

BACKGROUND OF THE INVENTION

1. Field of the Invention

The preset invention relates to a pressure-sensitive adhesive composition having antistatic ability, and an antistatic pressure-sensitive adhesive sheet and surface protecting film obtained by converting into a sheet or a tape using the composition. A pressure-sensitive adhesive sheet comprising the antistatic pressure-sensitive adhesive composition of the present invention is suitably used in plastic products on which static electricity is easily generated. Inter alia, in particular, they are useful as an antistatic pressure-sensitive adhesive sheet and surface protecting film which are used in fields disliking static electricity such as electronic instruments.

2. Description of the Related Art

A surface protecting film is generally used for the purpose of preventing a scratch or a stain generated at procession or conveyance of a subject to be protected by attaching the film via a pressure-sensitive adhesive coated on a protecting film side. For example, a panel of a liquid crystal display is formed by attaching an optical member such as a polarizing plate and a wavelength plate to a liquid crystal cell via an adhesive. A protecting film is attached to these optical members to be attached to a liquid crystal cell via a pressure-sensitive adhesive for the purpose of preventing a scratch or a stain.

And, at a stage at which a protecting film becomes unnecessary by attaching this optical member to a liquid crystal cell, a protecting film is removed by peeling. Generally, since a protecting film and an optical member are constructed of a plastic material, electrical insulating property is high, and static electricity is generated upon friction or peeling. Therefore, also when a protecting film is peeled from an optical member such as a polarizing plate, static electricity is generated. When a voltage is applied to a liquid crystal in the state where static electricity remains, orientation of a liquid crystal molecule is lost, and a defect of a panel is generated. Then, in order to prevent such the inconvenience, a surface protecting film is subjected to various antistatic treatments.

For example, a method of preventing electrification by adding one or more kinds of surfactants to a pressure-sensitive adhesive, and transferring surfactants to an adherend from a pressure-sensitive adhesive is disclosed (e.g. JP-A No. 9-165460). However, this invention is an invention in which a surfactant is transferred to an adherend by bleeding on a pressure-sensitive adhesive surface and, when attached to a protecting film, stain onto an adherend is not avoided. In addition, when an amount of a surfactant to be added is reduced in view of stain onto an adherend, sufficient antistatic ability is not obtained. Therefore, when a pressure-sensitive adhesive with a low-molecular surfactant added thereto is applied to a protecting film for an optical member, it is difficult to manifest sufficient antistatic without deteriorating optical property of an optical member.

In addition, a method for suppressing an antistatic agent from bleeding on a pressure-adhesive surface by adding an antistatic agent consisting of polyether polyol and an alkali metal salt to an acryl pressure-sensitive adhesive is disclosed (e.g. JP-A No. 6-128539). However, also in this method, bleeding of an antistatic agent is not avoided. As a result, it was found that, in the case where actually applied to a surface protecting film, when treatment is performed with long time or under a high temperature, there arises a problem that a surface protecting film is partially peeled off from an adherend by bleeding phenomenon.

SUMMARY OF THE INVENTION

Considering these circumstances, an object of the present invention is to provide a pressure-sensitive adhesive composition excellent in adhesion reliance by which electrification of a non-electrification-prevented adherend is prevented upon peeling, and occurrence of peeling off is suppressed even when via treatment with time or under a high temperature, as well as an antistatic pressure-sensitive adhesive sheet and a surface protecting film using this.

Preferably, an object of the present invention is to provide a pressure-sensitive adhesive composition in which stain onto an adherend is further reduced, as well as an antistatic pressure-sensitive adhesive sheet, and a surface protecting film using this.

In order to solve the aforementioned problem, the present inventors intensively studied and, as a result, found out that the object can be attained by a pressure-sensitive adhesive composition shown below, which resulted in completion of the present invention.

That is, a pressure-sensitive adhesive composition of the present invention is characterized in that said composition contains an ionic liquid, and a polymer having a glass transition temperature Tg of 0° C. or lower as a base polymer, as well as an ethylene oxide group-containing compound and/or a surfactant. Herein, an ionic liquid refers to a melt salt (ionic compound) exhibiting liquid state at room temperature (25° C.).

According to the present invention, by action of the ionic liquid as an antistatic agent and use of this, bleeding of an antistatic agent is suppressed, occurrence of peeling off is suppressed even with long time or under a high temperature, and a pressure-sensitive adhesive composition excellent in adhesion reliance onto an adherend is obtained. Although details of the reason why bleeding is suppressed by using an ionic liquid is not clear, it is thought to be due to high compatibility into a base polymer. In addition, since an ionic liquid itself exhibits excellent electric conductivity, sufficient antistatic ability is obtained even at a fine amount of stain onto an adherent surface. Further, in the present invention, by using an ethylene oxide group-containing compound and/or a surfactant additionally, further excellent antistatic ability is obtained. The reason why antistatic is further improved by using an ethylene oxide group-containing compound etc. additionally is not clear, but it is thought that wettability to a non-polar material such as fluorine is improved, and excellent antistatic ability to a non-polar adherend is obtained. In addition, since an ionic liquid is liquid-like at room temperature, addition to and dispersion or dissolution in a pressure-sensitive adhesive are easily performed as compared with a solid salt. Further, since an ionic liquid has no vapor pressure (nonvolatile), the liquid is not lost with time, and the liquid has characteristic that antistatic is continuously obtained.

In the foregoing, it is preferable that the ionic liquid is any one kind or more of a nitrogen-containing onium salt, a sulfur-containing onium salt, and a phosphorus-containing onium salt. In particular, it is preferable that the ionic liquid contains one or more kinds of cations represented by the following general formula (A) to (D). By an ionic liquid having these cations, further excellent antistatic ability is obtained.

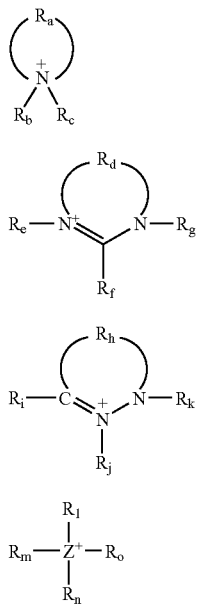

[$R_a$ in the formula (A) represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present]

[$R_d$ in the formula (B) represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom]

[$R_h$ in the formula (C) represents a hydrocarbon group of a carbon number of 2 to 20, and may contain a hetero atom, and $R_i$, $R_j$ and $R_k$ are the same or different, represent hydrogen or a hydrocarbon group of a carbon number of 1 to 16, and may contain a hetero atom]

[Z in the formula (D) represents a nitrogen atom, a sulfur atom or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present]

In addition, it is preferable that the ethylene oxide group-containing compound is a surfactant containing an ethylene oxide group. By using a surfactant having an ethylene oxide group, compatibility with an ionic liquid and a base polymer is further improved, bleeding onto ah adherend, and a low staining pressure-sensitive adhesive composition is obtained Further, it is preferable that a polymer having a glass transition temperature Tg of 0° C. or lower is an acryl-based polymer containing, as a main component, one or more kinds of acrylate and/or methacylate having an alkyl group of a carbon number of 1 to 14. By these acryl-based polymers, balance between compatibilities with an ionic liquid and a base polymer becomes better, and pressure-sensitive adhesive property can be sufficiently maintained.

On the other hand, the pressure-sensitive adhesive layer of the present invention is characterized in that the aforementioned pressure-sensitive adhesive composition is crosslinked. By performing crosslinking by appropriately regulating selection of a constitutional unit, and a constitutional ratio of a (meth)acryl-based polymer, and a crosslinking agent, and an addition ratio, a pressure-sensitive adhesive sheet more excellent in heat-resistance may be obtained.

In addition, the pressure-sensitive adhesive sheet of the present invention is characterized in that it has a pressure-sensitive adhesive layer containing the pressure-sensitive adhesive composition described anywhere on one side or both sides of a support. According to the pressure-sensitive adhesive sheet of the present invention, since the pressure-sensitive adhesive composition of the present invention exerting the aforementioned action and effect is used, a pressure-sensitive adhesive sheet excellent in adhesion reliance is obtained in which electrification of a non-electrification-prevented adherend is prevented upon peeling, occurrence of staining is suppressed even with long time or via treatment under a high temperature, and preferably stain onto an adherend is reduced.

Further, a surface protecting film of the present invention is characterized in that said film has a pressure-sensitive adhesive layer containing the pressure-sensitive adhesive composition described above anywhere on one side or both sides of a support. According to the surface protecting film of the present invention, since the pressure-sensitive adhesive composition of the present invention exerting the aforementioned action and effect is used, a surface protecting film excellent in adhesion reliance is obtained in which electrification of a non-electrification-prevented adherend is prevented upon peeling, occurrence of peeling off is suppressed even with time or via treatment under a high temperature, and preferably stain onto an adherend is reduced.

DETAILED DESCRIPTION OF THE PREFERRED EMBODIMENT

Figure 1:
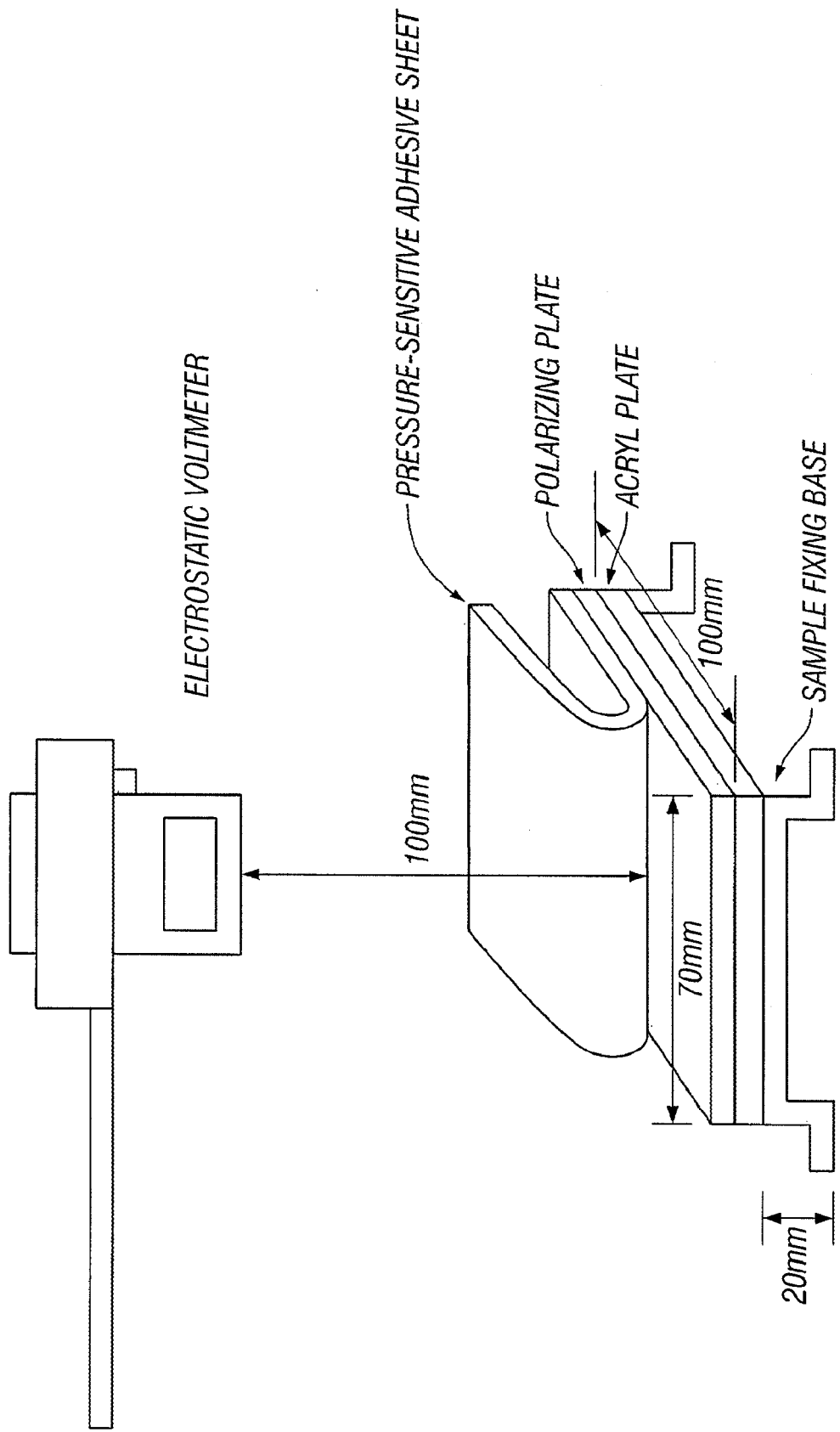
FIG. 1 is a construction view schematically showing a voltage measuring part which is used for measuring a peeling electrification voltage in Examples.

The pressure-sensitive adhesive composition of the present invention contains an ionic liquid, and a polymer having a glass transition temperature Tg of 0° C. or lower as a base polymer, as well as an ethylene oxide group-containing compound and/or a surfactant. An ionic liquid refers to as melt salt (ionic compound) exhibiting liquid state at room temperature (25° C.).

As the ionic liquid, a nitrogen-containing onium salt, a sulfur-containing onium salt, or a phosphorus-containing onium salt is preferably used and, since particularly preferably antistatic is obtained, a salt consisting of an organic cation component represented by the following general formulas (A) to (D), and an anion component is preferably used.

-continued

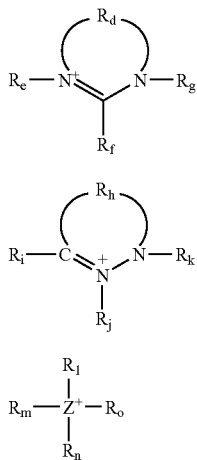

[$R_a$ in the formula (A) represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present]

[$R_d$ in the formula (B) represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom]

[$R_h$ in the formula (C) represents a hydrocarbon group of a carbon number of 2 to 20, and may contain a hetero atom, and $R_i$, $R_j$ and $R_k$ are the same or different, represent hydrogen or a hydrocarbon group of a carbon number of 1 to 16, and may contain a hetero atom]

[Z in the formula (D) represents a nitrogen atom, a sulfur atom or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present]

Examples of a cation represented by the formula (A) include a pyridinium cation, a piperidinium cation, a pyrrolidinium cation, a cation having a pyrroline skeleton, and a cation having a pyrrole skeleton. Specific examples include a 1-ethylpyridinium cation, a 1-butylpyridinium cation, a 1-hexylpyridinium cation, a 1-butyl-3-methylpyridinium cation, a 1-butyl-4-methylpyridinium cation, a 1-hexyl-3-methylpyridinium cation, a 1-butyl-3,4-dimethylpyridinium cation, a 1,1-dimethylpyrrolidinium cation, a 1-ethyl-1-methylpyrrolidinium cation, a 1-methyl-1-propylpyrrolidinium cation, a 1-methyl-1-butylpyrrolidinium cation, a 1-methyl-1-pentylpyrrolidinium cation, a 1-methyl-1-hexylpyrrolidinium cation, a 1-methyl-1-heptylpyrrolidinium cation, a 1-ethyl-1-propylpyrrolidinium cation, a 1-ethyl-1-butylpyrrolidinium cation, a 1-ethyl-1-pentylpyrrolidinium cation, a 1-ethyl-1-hexylpyrrolidinium cation, a 1-ethyl-1-heptylpyrrolidinium cation, a 1,1-dipropylpyrrolidinium cation, a 1-propyl-1-butylpyrrolidinium cation, a 1,1-dibutylpyrrolidinium cation, a 1-propylpiperidinium cation, a 1-pentylpiperidinium cation, a 1,1-dimethylpiperidinium cation, a 1-methyl-1-ethylpiperidinium cation, a 1-methyl-1-propylpiperidinium cation, a 1-methyl-1-butylpiperidinium cation, a 1-methyl-1-pentylpiperidinium cation, a 1-methyl-1-hexylpiperidinium cation, a 1-methyl-1-heptylpiperidinium cation, a 1-ethyl-1-propylpiperidinium cation, a 1-ethyl-1-butylpiperidinium cation, a 1-ethyl-1-pentylpiperidinium cation, a 1-ethyl-1-hexylpiperidinium cation, a 1-ethyl-1-heptylpiperidinium cation, a 1,1-dipropylpiperidinium cation, a 1-propyl-1-butylpiperidinium cation, a 1,1-dibutylpiperidinium cation, a 2-methyl-1-pyrroline cation, a 1-ethyl-2-phenylindole cation, a 1,2-dimethylindole cation, a 1-ethylcarbazole cation.

Examples of a cation represented by the formula (B) include an imidazolium cation, a tetrahydropyrimidinium cation, and a dihydropyrimidinium cation. Specific examples include a 1,3-dimethylimidazolium cation, a 1,3-diethylimidazolium cation, a 1-ethyl-3-methylimidazolium cation, a 1-butyl-3-methylimidazolium cation, a 1-hexyl-3-methylimidazolium cation, a 1-octyl-3-methylimidazolium cation, a 1-decyl-3-methylimidazolium cation, a 1-dodecyl-3-methylimidazolium cation, a 1-tetradecyl-3-methylimidazolium cation, a 1,2-dimethyl-3-propylimidazolium cation, a 1-ethyl-2,3-dimethylimidazolium cation, a 1-butyl-2,3-dimethylimidazolium cation, a 1-hexyl-2,3-dimethylimidazolium cation, a 1,3-dimethyl-1,4,5,6-tetrahydropyrimidinium cation, 1,2,3-trimethyl-1-4,5,6-tetrahydropyrimidinium cation, a 1,2,3,4-tetramethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, and a 1,2,3,4-tetramethyl-1,6-dihdydropyrimidinium cation.

Examples of a cation represented by the formula (C) include a pyrazolium cation, and a pyrazolinium cation. Specific examples include a 1-methylpyrazolium cation, a 3-methylpyrazolium cation, and a 1-ethyl-2-methylpyrazolium cation.

Examples of a cation represented by the formula (D) include a tetraalkylammonium cation, a trialkylsulfonium cation, a tetraalkylphosphonium cation, and a cation in which a part of the alkyl group is substituted with an alkenyl group or an alkoxyl group, or further an epoxy group.

Specific examples include a tetramethylammonium cation, a tetraethylammonium cation, a tetrapropylammonium cation, a tetrabutylammonium cation, a tetrapentylammonium cation, a tetrahexylammonium cation, a tetraheptylammonium cation, a trimethylheptylammonium cation, trimethyldecylammonium cation, a triethylmethylammonium cation, a triethylpropylammonium cation, a triethylpentylammonium cation, a triethylhexylammonium cation, a triethylheptylammonium cation, a tributylethylammonium cation, a tripentylbutylammonium cation, a trihexylmethylammonium cation, a trihexylpentylammonium cation, a triheptylmethylammonium cation, a triheptylhexylammonium cation, a trioctylmethylammonium cation, a glycidyltrimethylammonium cation, a diallyldimethylammonium cation, a N,N-dimethyl-N,N-dipropylammonium cation, a N,N-dimethyl-N,N-dihexylammonium cation, a N,N-dipropyl-N,N-dihexylammonium cation, a N,N-dimethyl-N-ethyl-N-propylammonium cation, a N,N-dimethyl-N-ethyl-N-butylammonium cation, a N,N-dimethyl-N-ethyl-N-pentylammonium cation, a N,N-dimethyl-N-ethyl-N-hexylammonium cation, a N,N-dimethyl-N-ethyl-N-heptylammonim cation, N,N-dimethyl-N-ethyl-N-nonylammonium cation, a N,N-dimethyl-N-propyl-N-butylammonium cation, a N,N-dimethyl-N-propyl-N-pentylammonium cation, a N,N-dimethyl-N-propyl-N- hexylammonium cation, a N,N-dimethyl-N-propyl-N-heptylammonium cation, a N,N-dimethyl-N-butyl-N-hexylammonium cation, a N,N-dimethyl-N-butyl-N-heptylammonim cation, a N,N-dimethyl-N-pentyl-N-hexylammonium cation, a N,N-dimethyl-N-hexyl-N-heptylammonium cation, N,N-diethyl-N-methyl-N-propylammonium cation, a N,N-diethyl-N-methyl-N-pentylammonium cation, a N,N-diethyl-N-methyl-N-heptylammonium cation, a N,N-diethyl-N-methyl-N-(2-methoxyethyl) ammonium cation, a N,N-diethyl-N-propyl-N-pentylammonium cation, a N,N-dipropyl-N-methyl-N-ethylammonium cation, a N,N-dipropyl-N-methyl-N-pentylamonium cation, a N,N-dipropyl-N-butyl-N-hexylammonium cation, a N,N-dibutyl-N-methyl-N-pentylammonium cation, a N,N-dibutyl-N-methyl-N-hexylammonium cation, a N-methyl-N-ethyl-N-propyl-N-pentylammonium cation, a trimethylsulfonium cation, a triethylsulfonium cation, a tributylsulfonium cation, a trihexylsulfonium cation, a dimethyldecylsulfonium cation, a diethylmethylsulfonium cation, a dibutylethylsulfonium cation, a tetramethylphosphonium cation, a tetraethylphosphonium cation, a tetrabutylphosphonium cation, a tetrapentylphosphonium cation, a tetrahexylphosphonium cation, a tetraheptylphosphonium cation, a tetraoctylphosphonium cation, a trimethyldecylphosphonium cation, a triethylmethylphosphonium cation, and a tributylethylphosphonium cation. Inter alia, non-symmetric tetraalkylammonium cations such as trimethylheptylammonium cation, a trimethyldecylammonium cation, a triethylmethylammonium cation, a triethylpropylammonium cation, a triethylpentylammonium cation, a triethylhexylammonium cation, a triethylheptylammonium cation, a tributylethylammonium cation, a tripentylbutylammonium cation, a trihexylmethylammonium cation, a trihexylpentylammonium cation, a triheptylmethylammonium cation, a triheptylhexylammonium cation, a trioctylmethylammonium cation, a glycidyltrimethylammonium cation, a N,N-dimethyl-N-ethyl-N-propylammonium cation, a N,N-dimethyl-N-ethyl-N-butylammonium cation, a N,N-dimethyl-N-ethyl-N-pentylammonium cation, a N,N-dimethyl-N-ethyl-N-hexylammonium cation, a N,N-dimethyl-N-ethyl-N-heptylammonium cation, a N,N-dimethyl-N-ethyl-N-nonylammonium cation, a N,N-dimethyl-N-propyl-N-butylammonium cation, a N,N-dimethyl-N-propyl-N-pentylammonium cation, a N,N-dimethyl-N-propyl-N-hexylamonium cation, a N,N-dimethyl-N-propyl-N-heptylammonium cation, a N,N-dimethyl-N-butyl-N-hexylammonium cation, a N,N-dimethyl-N-butyl-N-heptylammonium cation, a N,N-dimethyl-N-pentyl-N-hexylammonium cation, a N,N-dimethyl-N-hexyl-N-heptylammonium cation, a N,N-diethyl-N-methyl-N-propylammonium cation, a N,N-diethyl-N-methyl-N-pentylammonium cation, a N,N-diethyl-N-methyl-N-heptylammonium cation, a N,N-diethyl-N-methyl-N-(2-methoxyethyl)ammonium cation, a N,N-diethyl-N-propyl-N-pentylammonium cation, a N,N-dipropyl-N-methyl-N-ethylammonium cation, a N,N-dipropyl-N-methyl-N-pentylammonium cation, a N,N-dipropyl-N-butyl-N-hexylammonium cation, a N,N-dibutyl-N-methyl-N-pentylamonium cation, a N,N-dibutyl-N-methyl-N-hexylammonium cation, and a N-methyl-N-ethyl-N-propyl-N-pentylammonium cation, non-symmetric trialkylsulfonium cations such as dimethyldecylsulfonium cation, a diethylmethylsulfonium cation, and a dibutylethylsulfonium cation, and non-symmetric tetralkylphosphonium cations such as a trimethyldecylphosphonium cation, a triethylmethylphosphonium cation, and a tributylethylphosphonium cation are preferably used.

On the other hand, an anion component is not particularly limited as far as it satisfies that the component becomes an ionic liquid and, for example, $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $(CF_3SO_2)_2N^-$, $(CF_3SO_2)_3C^-$, $AsF_6^-$, $SbF_6^-$, $NbF_6^-$, $TaF_6^-$, $F(HF)_n^-$, $(CN)_2N^-$, $C_4F_9SO_3^-$, $(C_2F_5SO_2)_2N^-$, $C_3F_7COO^-$, and $(CF_3SO_2)(CF_3CO)N^-$ are used. Inter alia, particularly, since an ionic compound having a low melting point is obtained from an anion component containing a fluorine atom, the component is preferably used.

An embodiment of an ionic liquid used in the present invention can be used by appropriately selecting from a combination of the cationic component and the anionic component, and examples include 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridiinium bis(trifluoromethanesulfonyl)imide, 1-butyl-3-methylpyridinium bis(pentafluoroethanesulfonyl)imide, 1-hexylpyridinium tetrafluoroborate, 1,1-dimethylpyrrolidinium bis(trifluoromethanesulfonyl)imide, 1-methyl-1-ethylpyrrolidinium bis(trifluoromethanesulfonyl)imide, 1-methyl-1-propylpyrrolidinium bis(trifluoromethanesulfonyl)imide, 1-methyl-1-butylpyrrolidinium bis(trifluoromethanesulfonyl)imide, 1-methyl-1-pentylpyrrolidinium bis(trifluoromethanesulfonyl)imide, 1-methyl-1-hexylpyrrolidinium bis(trifluoromethanesulfonyl)imide, 1-methyl-1-heptylpyrrolidinium bis(trifluoromethanesulfonyl)imide, 1-ethyl-1-propylpyrrolidinium bis(trifluoromethanesulfonyl)imide, 1-ethyl-1-butylpyrrolidinium bis(trifluoromethanesulfonyl)imide, 1-ethyl-1-pentylpyrrolidinium bis(trifluoromethanesulfonyl)imide, 1-ethyl-1-hexylpyrrolidinium bis(trifluoromethanesulfonyl)imide, 1-ethyl-1-heptylpyrrolidinium bis(trifluoromethanesulfonyl)imide, 1,1-dipropylpyrrolidinium bis(trifluoromethanesulfonyl)imide, 1-propyl-1-butylpyrrolidinium bis(trifluoromethanesulfonyl)imide, 1,1-dibutylpyrrolidinium bis(trifluoromethanesulfonyl)imide, 1-propylpiperidinium bis(trifluoromethanesulfonyl)imide, 1-pentylpiperidinium bis(trifluoromethanesulfonyl)imide, 1,1-dimethylpiperidinium bis(trifluoromethanesulfonyl)imide, 1-methyl-1-ethylpiperidinium bis(trifluoromethanesulfonyl)imide, 1-methyl-1-propylpiperidinium bis(trifluoromethanesulfonyl)imide, 1-methyl-1-butylpiperidinium bis(trifluoromethanesulfonyl)imide, 1-methyl-1-pentylpiperidinium bis(trifluoromethanesulfonyl)imide, 1-methyl-1-hexylpiperidinium bis(trifluoromethanesulfonyl)imide, 1-methyl-1-heptylpiperidinium bis(trifluoromethanesulfonyl)imide, 1-ethyl-1-propylpiperidinium bis(trifluoromethanesulfonyl)imide, 1-ethyl-1-butylpiperidinium bis(trifluoromethanesulfonyl)imide, 1-ethyl-1-pentylpiperidinium bis(trifluoromethanesulfonyl)imide, 1-ethyl-1-hexylpiperidinium bis(trifluoromethanesulfonyl)imide, 1-ethyl-1-heptylpiperidinium bis(trifluoromethanesulfonyl)imide, 1,1-dipropylpiperidinium bis(trifluoromethanesulfonyl)imide, 1-propyl-1-butylpiperidinium bis(trifluoromethanesulfonyl)imide, 1,1-dibutylpiperidinium bis(trifluoromethanesulfonyl)imide, 1,1-dimethylpyrrolidinium bis(pentafluoroethanesulfonyl)imide, 1-methyl-1-ethylpyrrolidinium bis(pentafluoroethanesulfonyl)imide, 1-methyl-1-propylpyrrolidinium bis(pentafluoroethanesulfonyl)imide, 1-methyl-1-butylpyrrolidinium bis(pentafluoroethanesulfonyl)imide, 1-methyl-1-pentylpyrrolidinium bis(pentafluoroethanesulfonyl)imide, 1-methyl-1-hexylpyrrolidinium bis(pentafluoroethanesulfonyl)imide, 1-methyl-1-heptylpyrrolidinium bis(pentafluoroethanesulfonyl)imide, 1-ethyl-1- propylpyrrolidinium bis(pentafluoroethanesulfonyl)imide, 1-ethyl-1-butylpyrrolidinium bis(pentafluoroethanesulfonyl)imide, 1-ethyl-1-pentylpyrrolidinium bis(pentafluoroethanesulfonyl)imide, 1-ethyl-1-hexylpyrrolidinium bis(pentafluoroethanesulfonyl)imide, 1-ethyl-1-heptylpyrrolidinium bis(pentafluoroethanesulfonyl)imide, 1,1-dipropylpyrrolidinium bis(pentafluoroethanesulfonyl)imide, 1-propyl-1-butylpyrrolidinium bis(pentafluoroethanesulfonyl)imide, 1,1-dibutylpyrrolidinium bis(pentafluoroethanesulfonyl)imide, 1-propylpiperidinium bis(pentafluoroethanesulfonyl)imide, 1-pentylpiperidinium bis(pentafluoroethanesulfonyl)imide, 1,1-dimethylpiperidinium bis(pentafluoroethanesulfonyl)imide, 1-methyl-1-ethylpiperidinium bis(pentafluoroethanesulfonyl)imide, 1-methyl-1-propylpiperidinium bis(pentafluoroethanesulfonyl)imide, 1-methyl-1-butylpiperidinium bis(pentafluoroethanesulfonyl)imide, 1-methyl-1-pentylpiperidnium bis(pentafluoroethanesulfonyl)imide, 1-methyl-1-hexylpiperidinium bis(pentafluoroethanesulfonyl)imide, 1-methyl-1-heptylpiperidinium bis(pentafluoroethanesulfonyl)imide, 1-ethyl-1-propylpiperidinium bis(pentafluoroethanesulfonyl)imide, 1-ethyl-1-butylpiperidinium bis(pentafluoroethanesulfonyl)imide, 1-ethyl-1-pentylpiperidinium bis(pentafluoroethanesulfonyl)imide, 1-ethyl-1-hexylpiperidinium bis(pentafluoroethanesulfonyl)imide, 1-ethyl-1-heptylpiperidinium bis(pentafluoroethanesulfonyl)imide, 1,1-dipropylpiperidinium bis(pentafluoroethanesulfonyl)imide, 1-propyl-1-butylpiperidinium bis(pentafluoroethanesulfonyl)imide, 1,1-dibutylpiperidinium bis(pentafluoroethanesulfonyl)imide, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutylate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazolium bis(trifluoromethanesulfonyl)imide, 1-ethyl-3-methylimidazolium bis(pentafluoroethanesulfonyl)imide, 1-ethyl-3-methylimidazolium tris(trifluoromethanesulfonyl)methide, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethanesulfonate, 1-butyl-3-methylimidazolium perfluorobutanesulfonate, 1-butyl-3-methylimidazolium bis(trifluoromethanesulfonyl)imide 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazolium bis(trifluoromethanesulfonyl)imide, 1-methylpyrazolium tetrafluoroborate, 3-methylpyrazolium tetrafluoroborate, tetrahexylammonium bis(trifluoromethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoroethanesulfonyl)imide, N,N-diethyl-N-methyl-N-(2-methoxyethyl)ammonium tetrafluoroborate, N,N-diethyl-N-methyl-N-(2-methoxyethyl)ammonium trifluoromethanesulfonate, N,N-diethyl-N-methyl-N-(2-methoxyethyl)ammonium bis(trifluoromethanesulfonyl)imide, N,N-diethyl-N-methyl-N-(2-methoxyethyl)ammonium bis(pentafluoroethanesulfonyl)imide, glycidyltrimethylammonium trifluoromethanesulfonate, glydicyltrimethylammonium bis(trifluoromethanesulfonyl)imide, glycidyltrimethylammonium bis(pentafluoroethanesulfonyl)imide, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethanesulfonyl)trifluoroacetamide, N,N-diethyl-N-methyl-N-(2-methoxyethyl)ammonium (trifluoromethanesulfonyl)trifluoroacetamide, diallyldimethylammonium (trifluoromethanesulfonyl)trifluoroacetamide, glycidyltrimethylammonium (trifluoromethanesulfonyl)trifluoroacetamide, N,N-dimethyl-N-ethyl-N-propylammonium bis(trifluoromethanesulfonyl)imide, N,N-dimethyl-N-ethyl-N-butylammonium bis(trifluoromethanesulfonyl)imide, N,N-dimethyl-N-ethyl-N-pentylammonium bis(trifluoromethanesulfonyl)imide, N,N-dimethyl-N-ethyl-N-hexylammonium bis(trifluoromethanesulfonyl)imide, N,N-dimethyl-N-ethyl-N-heptylammonium bis(trifluoromethanesulfonyl)imide, N,N-dimethyl-N-ethyl-N-nonylammonium bis(trifluoromethanesulfonyl)imide, N,N-dimethyl-N,N-dipropylammonium bis(trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, N,N-dimethyl-N-propyl-N-hexylammonium bis(trifluoromethanesulfonyl)imide, N,N-dimethyl-N-propyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl)imide, N,N-dipropyl-N-methyl-N-pentylammonium bis(trifluoromethanesulfonyl)imide, N,N-dipropyl-N-butyl-N-hexylammonium bis(trifluoromethanesulfonyl)imide, N,N-dipropyl-N,N-dihexylammonium bis(trifluoromethanesulfonyl)imide, N,N-dibutyl-N-methyl-N-pentylammonium bis(trifluoromethanesulfonyl)imide, N,N-dibutyl-N-methyl-N-hexylammonium bis(trifluoromethanesulfonyl)imide, trioctylmethylammonium bis(trifluoromethanesulfonyl)imide, and N-methyl-N-ethyl-N-propyl-N-pentylammonium bis(trifluoromethanesulfonyl)imide.

As the aforementioned ionic liquid, a commercially available ionic liquid may be used, and it may be also synthesized as described below. A method of synthesizing an ionic liquid is not particularly limited as far as an objective ionic liquid is obtained. Generally, a halide method, a hydroxide method, an acid ester method, a complex formation method, and a neutralization method described in reference "Ionic Liquid-Frontier Future of Development-" published by CMC Publisher are used.

A synthesis method in a halide method, a hydroxide method, an acid ester method, a complex formation method, and a neutralization method will be shown below using a nitrogen-containing onium salt as an example, and other ionic liquids such as a sulfur-containing onium salt, and a phosphorus-containing onium salt can be obtained by a similar procedure.

A halide method is a method which is performed by a reaction shown in the following equations (1) to (3). First, tertiary amine and alkyl halide are reacted to obtain a halide (reaction equation (1); as a halogen, chlorine, bromine and iodine are used).

The resulting halide is reacted with an acid (HA) or a salt (MA, M is a cation forming a salt with an anion, such as ammonium, lithium, sodium, potassium) having an anion structure (A$^-$) of an objective ionic liquid, to obtain an objective ionic liquid ($R_4NA$).

$$R_3N + RX \rightarrow R_4NX \ (X:Cl,Br,I) \quad (1)$$

$$R_4NX + HA \rightarrow R_4NA + HX \quad (2)$$

$$R_4NX + MA \rightarrow R_4NA + MX \ (M:NH_4, Li, Na, K, Ag \text{ etc.}) \quad (3)$$

A hydroxide method is a method which is performed by a reaction shown in (4) to (8). First, a halide ($R_4NX$) is subjected to ion exchange membrane method electrolysis (reaction equation (4)), an OH-type ion exchange resin method (reaction equation (5)) or a reaction with silver oxide ($Ag_2O$) (reaction equation (6)) to obtain hydroxide ($R_4NOH$) (as a halogen, chlorine, bromine, iodine is used).

The resulting hydroxide is subjected to a reaction of a reaction equation (7) to (8) to obtain an objective ionic liquid ($R_4NA$) as in the aforementioned halide method.

$$R_4NX + H_2O \rightarrow R_4NOH + \tfrac{1}{2}H_2 + \tfrac{1}{2}X_2 \ (X:Cl,Br,I) \quad (4)$$

$$R_4NX + P\!-\!OH \rightarrow R_4NOH + P\!-\!X \ (P\!-\!OH: OH\text{-type ion exchange resin}) \quad (5)$$

$$R_4NX + \tfrac{1}{2}Ag_2O + \tfrac{1}{2}H_2O \rightarrow R_4NOH + AgX \quad (6)$$

$$R_4NOH + HA \rightarrow R_4NA + H_2O \quad (7)$$

$$R_4NOH + MA \rightarrow R_4NA + MOH \ (M:NH_4, Li, Na, K, Ag \text{ etc.}) \quad (8)$$

An acid ester method is a method which is performed by a reaction shown in (9) to (11). First, tertiary amine ($R_3N$) is reacted with acid ester to obtain an acid esterified entity (reaction equation (9); as acid ester, an ester of an inorganic acid such as sulfuric acid, sulfurous acid, phosphoric acid, phosphorous acid, and carbonic acid, and an ester of organic acid such as methanesulfonic acid, methylphosphonic acid, and formic acid are used.

The resulting acid esterified entity is subjected to a reaction of a reaction equation (10) to (11) to obtain an objective ionic liquid ($R_4NA$) as in the halide method. Alternatively, by using methyltrifluoromethanesulfonate, or methyl trifluoroacetate as acid ester, an ionic liquid can be also obtained directly.

$$R_3N + ROY \rightarrow R_4NOY \quad (3)$$

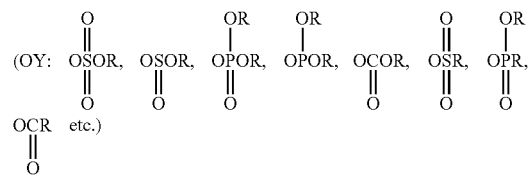

$$R_4NOY + HA \rightarrow R_4NA + HOY \quad (10)$$

(in the case of OY:

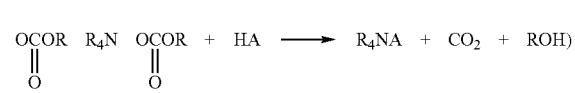

$$R_4NOY + MA \rightarrow R_4NA + MOY \ (M:NH_4, Li, Na, K, Ag \text{ etc.}) \quad (11)$$

A complex formation method is a method which is performed by a reaction shown in (12) to (15). First, halide of quaternary ammonium ($R_4NH$), hydroxide of quaternary ammonium ($R_4NOH$), or carbonic acid esterified entity of quaternary ammonium ($R_4NOCO_2CH_3$) is reacted with hydrogen fluoride (HF) or ammonium fluoride ($NH_4F$) to obtain a quaternary ammonium fluoride salt (reaction equation (12) to (14)).

The resulting quaternary ammonium fluoride salt can be subjected to a complex forming reaction with fluoride such as $BF_3$, $AlF_3$, $PF_5$, $AsF_5$, $SbF_5$, $NbF_5$ and $TaF_5$ to obtain an ionic liquid (reaction equation (15)).

$$R_4NX + HF \rightarrow R_4NF + HX \ (X:Cl,Br,I) \quad (12)$$

$$R_4NY + HF \rightarrow R_4NF + HY \ (Y:OH, OCO_2CH_3) \quad (13)$$

$$R_4NY + NH_4F \rightarrow R_4NF + NH_3 + HY \ (Y:OH, OCO_2CH_3) \quad (14)$$

$$R_4NF + MF_{n-1} \rightarrow R_4NMF_n \ (MF_{n-1}: BF_3, AlF_3, PF_5, AsF_5, SbF_5, NbF_5, TaF_5 \text{ etc.}) \quad (15)$$

A neutralization method is a method which is performed by a reaction shown in (16). An objective entity can be obtained by reacting tertiary amine with an organic acid such as $HBF_4$, $HPF_6$, $CH_3COOH$, $CF_3COOH$, $CF_3SO_3H$, $(CF_3SO_2)_2NH$, $(CF_3SO_2)_2NH$, $(CF_3SO_2)_3CH$, and $(C_2F_5SO_2)_2NH$.

$$R_3N + HZ \rightarrow R_3HN^+Z^- \quad (16)$$

[HZ: $HBF_4$, $HPF_6$, $CH_3COOH$, $CF_3COOH$, $CF_3SO_3H$, $(CF_3SO_2)_2NH$, $(CF_3SO_2)_3CH$, $(C_2F_5SO_2)_2NH$ organic acid such as]

R described in the above equations (1) to (16) represents hydrogen or a hydrocarbon group of a carbon number of 1 to 20, and may contain a hetero atom.

An amount of an ionic liquid to be blended can not be absolutely defined since it varies depending on compatibility between an acryl-based polymer to be used and an ionic liquid, but generally, 0.01 to 40 parts by weight is preferable, 0.03 to 20 part by weight is more preferable, and 0.05 to 10 part by weight is most preferable relative to 100 parts by weight of a base polymer. When the amount is less than 0.01 part by weight, sufficient antistatic is not obtained, and when the amount exceeds 40 parts by weight, there is a tendency that stain onto an adherend is increased.

The pressure-sensitive adhesive composition of the present invention contains an ethylene oxide group-containing compound and/or a surfactant. An ethylene oxide group compound may be a surfactant having an ethylene oxide group.

An ethylene oxide group-containing compound in the present invention is not particularly limited as far as it is a compound having an ethylene oxide group, but examples include polyoxyethylenealkylamine, polyoxyethylenediamine, ethylene glycol group-containing acryl-based polymer, ethylene oxide group-containing polyether-based polymer, ethylene oxide group-containing polyether ester amide, ethylene oxide group-containing polyether amideimide, polyoxyethylene glycol fatty acid ester, polyoxysorbitanic acid fatty acid ester, polyoxyethylene alkyl phenyl ether, and polyoxyethylene alkyl ether.

Inter alia, a polyether-based polymer or an acryl-based polymer having an ethylene oxide group is preferably used since balance of compatibility with a base polymer can be easily taken.

Examples of an ethylene oxide group-containing polyether-based polymer include a random copolymer and a block copolymer of polyethylene glycol and polypropylene glycol such as a block copolymer of polypropylene glycol-polyethylene glycol-polypropyelene golycol, a block copolymer of polypropylene glycol-polyethylene glycol, a block copolymer of polyethylene glycol-polypropylene glycol-polyethylene glycol, and a random copolymer of polypropylene glycol-polyethylene glycol. A terminus of a glycol chain may remain a hydroxyl group, or may be substituted with an alkyl group or a phenyl group.

A ratio of polyethylene glycol of these random copolymers and these block copolymers of polyethylene glycol and polypropylene glycol, 5 to 74% by weight is preferable, 10 to 70% by weight is more preferable. When a ratio of polyethylene glycol is less than 5% by weight, compatibility with an ionic liquid becomes worse, and there is a tendency that sufficient antistatic is hardly obtained and, when the ratio is 75% by weight or more, crystallizability becomes high, compatibility with an acryl-based polymer becomes worse, and there is a tendency that sufficient antistatic is hardly obtained.

As an ethylene glycol group-containing acryl-based polymer, an acryl-based polymer having ethylene glycol group-containing (meth)acrylate as an essential component is used.

As an addition mole number of an oxyethylene unit to (meth)acrylate, 1 to 30 is preferable, and 2 to 20 is more preferable from a viewpoint of coordination of an ionic liquid. A terminus of an ethylene oxide chain may remain a hydroxyl group, and may be substituted with an alkyl group or a phenyl group.

Examples of ethylene glycol group-containing (meth) acrylate include methoxy-polyethylene glycol (meth)acrylate type such as methoxy-diethylene glycol (meth)acrylate, and methoxy-triethylene glycol (meth)acrylate, ethoxy-polyethylene glycol (meth)acrylate type such as ethoxy-diethylene glycol (meth)acrylate, and ethoxy-triethylene glycol (meth)acrylate, butoxy-polyethylene glycol (meth)acrylate type such as butoxy-diethylene glycol (meth)acrylate, and butoxy-triethylene-glycol (meth)acrylate, phenoxy-polyethylene glycol (meth)acrylate type such as phenoxy-diethylene glycol (meth)acrylate, and phenoxy-triethylene glycol (meth) acrylate, 2-ethylhexyl-polyethylene glycol (meth)acrylate, and nonylphenol-polyethylene glycol (meth)acrylate type.

In addition, as a monomer component other than the aforementioned components, acrylate and/or methacrylate having an alkyl group of a carbon number of 1 to 14 such as methyl (meth)acrylate, ethyl (meth)acrylate, n-butyl (meth)acrylate, t-butyl (meth)acrylate, isobutyl (meth)acrylate, hexyl (meth) acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth) acrylate and n-tetradecyl (meth)acrylate can be also used.

Further, phosphoric acid group-containing (meth)acrylate, cyano group-containing (meth)acrylate, vinyl esters, aromatic vinyl compound, acid anhydride group-containing (meth)acrylate, hydroxyl group-containing (meth)acrylate, amido group-containing (meth)acrylate, amino group-containing (meth)acrylate, epoxy group-containing (meth)acrylate, N-acryloylmorpholine, and vinyl ethers may be also used.

As a ratio of ethylene glycol group-containing (meth)acrylate contained in an ethylene glycol group-containing (meth) acrylate polymer, 10 to 70% by weight is preferable. When a ratio of ethylene glycol group-containing (meth)acrylate is less than 10% by weight, compatibility with an ionic acid becomes worse, and sufficient antistatic is not obtained and, when the ratio exceeds 70% by weight, compatibility with an acryl-based polymer which is a base polymer becomes worse, and sufficient antistatic is not obtained. The aforementioned (meth)acrylate may be used alone, or may be used in a combination.

As a molecular weight of the ethylene oxide group-containing polyether-based polymer or ethylene glycol group-containing (meth)acrylate polymer, a number average molecular weight of 10000 or less, preferably 200 to 5000 is preferably used. When a number average molecular weight exceeds 10000, there is a tendency that stain property onto an adherend is deteriorated. A number average molecular weight refers to a molecular weight obtained by measurement by GPC (gel permeation chromatography).

An amount of ethylene oxide group-containing compound to be blended is 0.01 to 40 parts by weight, preferably 0.1 part by weight to 20 part by weight relative to 100 parts by weight of a base polymer. When the amount is less than 0.01 part by weight, sufficient electrification property is not obtained and, when the amount exceeds 40 parts by weight, staining onto an adherend is increased, there is a tendency that an adhesive strength is reduced.

In addition, from a viewpoint of antistatic ability, a ratio of a content of an ethylene oxide group-containing compound relative to an ionic liquid (former-latter) is preferably 0.1 to 1000, more preferably 0.2 to 100.

In the present invention, from a viewpoint that balance between antistatic and stain onto an adherend is made better, it is preferable that a solution in which an ionic liquid and an ethylene oxide group-containing compound are pre-mixed is prepared, and this is added to a base polymer to prepare a pressure-sensitive adhesive composition.

A surfactant in the present invention is preferably a surfactant having an ether group. Specific examples include non-ionic surfactants such as polyoxyalkylene fatty acid esters, polyoxyalkylene sorbitan fatty acid esters, polyoxyalkylene sorbitol fatty acid esters, polyoxyalkylene alkyl ethers, polyoxyalkylene alkyl allyl ethers, polyoxyalkylene alkyl phenyl ethers, polyoxyalkylene derivative, polyoxyalkylene alkylamines, and polyoxyalkylene alkylamine fatty acid esters, anionic surfactants such as polyoxyalkylene alkyl ether sulfate ester salts, polyoxyalkylene alkyl ether phosphate salts, polyoxyalkylene alkyl phenyl ether sulfate salts, and polyoxyalkylene alkyl phenyl ether phosphate salts, cationic surfactants and amphoteric surfactants having an alkylene oxide group. In addition, a reactive substituent such as a (meth) acryloyl group, and an allyl group may be contained in a molecule.

A surfactant in the present invention is further preferably a surfactant having an ethylene oxide group among the aforementioned surfactants having an ether group. Specific examples include nonionic surfactants such as polyoxyethylene fatty acid esters, polyoxyethylene sorbitan fatty acid esters, polyoxyethylene sorbitol fatty acid esters, polyoxyethylene alkyl ethers, polyoxyethylene alkyl allyl ethers, polyoxyethylene alkyl phenyl ethers, polyoxyethylene derivative, polyoxyethylene alkylamines, and polyoxyethylene alkylamine fatty acid esters, aminonic surfactants such as polyoxyethylene alkyl ether sulfate ester salts, polyoxyethylene alkyl ether phosphate ester salts, polyoxyethylene alkyl phenyl ether sulfate ester salts, and polyoxyethylene alkyl phenyl ether phosphate ester salts, cationic surfactants and amphoteric surfactants having an ethylene oxide group. In addition, a reactive substituent such as (meth)acryloyl group, and an allyl group may be contained in a molecule.

From a viewpoint of interaction with an ionic liquid, an addition mole number of an oxyalkylene unit of the aforementioned surfactant having an alkylene oxide group is preferably 1 to 50, more preferably 2 to 40. When an alkylene oxide group is not contained, balance of compatibility between an ionic liquid and a base polymer is hardly taken, and there is a tendency that bleeding onto an adherend is increased, being not preferable. On the other hand, when a surfactant having an addition mole number of an oxyalkylene unit exceeding 50 is used, an ionic liquid is restricted by an alkylene oxide group, and there is a tendency that antistatic is reduced, being not preferable.

The aforementioned surfactants may be used alone, or in a combination, and an amount to be blended is preferably 0.01 to 10 parts by weight, more preferably 0.05 to 5 parts by weight relative to 100 parts by weight of a base polymer. When an amount to be blended is less than 0.01 part by weight, effect of taking balance between antistatic and stain property is hardly obtained and, when the amount exceeds 10 parts by weight, there is a tendency that stain onto an adherend is increased, being not preferable.

In the present invention, in order to enhance antistatic performance of an adherend, an alkali metal salt may be blended at not less than 0.005 part by weight and less than 0.1 part by weight relative to 100 parts by weight of a base polymer. Examples of an alkali metal salt include metal salts containing lithium, sodium, or potassium. Specifically, for example, metal salts constructed of a cation consisting of $Li^+$, $Na^+$ or $K^+$, and an anion consisting of $Cl^-$, $Br^-$, $I^-$, $BF_4^-$, $PF_6^-$, $SCN^-$, $ClO_4^-$, $CF_3SO_3^-$, $(CF_3SO_2)_2N^-$, $(C_2F_5SO_2)_2N^-$, or $(CF_3SO_2)_3C^-$ are preferably used. Inter alia, lithium salts such as $LiBr$, $LiI$, $LiBF_4$, $LiPF_6$, $LiSCN$, $LiClO_4$, $LiCF_3SO_3$, $Li(CF_3SO_2)_2N$, $Li(C_2F_5SO_2)_2N$, and $Li(CF_3SO_2)_3C$ are preferably used. These alkali metal salts may be used alone, or may be used by mixing two or more kinds of them.

Regarding a blending amount of an alkali metal salt used in the pressure-sensitive adhesive composition, it is preferable that an alkali metal salt is blended at not less than 0.005 part by weight and less than 0.1 part by weight relative to 100 parts by weight of (meth)acryl-based copolymer. Further, the salt is preferably blended at 0.005 to 0.09 part by weight, more preferably at 0.005 to 0.08 part by weight. When the amount is less than 0.005 part by weight, sufficient antistatic property is not obtained in some cases. On the other hand, when the amount is greater than 0.1 part by weight, there is a tendency that stain onto an adherend is increased, being not preferable.

In the present invention, as a base polymer, a polymer having a glass transition temperature Tg of 0° C. or lower is used. Tg is preferably −100 to −5° C., more preferably −80 to −10° C. When a glass transition temperature Tg is higher than 0° C., it becomes difficult to obtain a sufficient adhesive strength in some cases.

Examples of such the polymer include polymers which are generally used as a polymer for a pressure-sensitive adhesive, such as an acryl-based polymer containing, as a main component, one or two or more kinds of acrylate and/or methacrylate having an alkyl group of a carbon number of 1 to 14, a natural rubber, a styrene-isoprene-styrene block copolymer (SIS block copolymer), a styrene-butadiene-styrene block copolymer (SBS block copolymer), a styrene-ethylene butylene-styrene block copolymer (SEBS block copolymer), a styrene-butadiene rubber, polybutadiene, polyisoprene, polyisobutylene, butyl rubber, chloroprene rubber, and silicone rubber.

Among them, since balance of compatibility with an ionic liquid, and excellent pressure-sensitive adhering property are obtained, an acryl-based polymer containing, as a main component, one or two or more kinds of acrylate and/or methacrylate having an alkyl group of a carbon number of 1 to 14 is preferably used.

As an acryl-based polymer containing, as a main component, one or two or more kinds of acrylate and/or methacrylate having an alkyl group of a carbon number of 1 to 14, an acryl-based polymer containing, as a main component, a polymer containing 50 to 100% by weight of one or two or more kinds of acrylate and/or methacrylate {hereinafter referred to as (meth)acrylate} having an alkyl group of a carbon number of 1 to 14 is used.

Examples of (meth)acrylate having an alkyl group of a carbon number of 1 to 14 include methyl (meth)acrylate, ethyl (meth)acrylate, n-butyl (meth)acrylate, s-butyl (meth)acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate.

Inter alia, as an acryl-based polymer used in the surface protecting film of the present invention, an acryl-based polymer comprising (meth)acrylate having an alkyl group of a carbon number of 6 to 14 such as hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate is preferably used. By using these acryl-based polymers comprising (meth)acrylate having an alkyl group of a carbon number of 6 to 14, it becomes easy to control an adhesive strength onto an adherend low, and excellent re-peelability is obtained.

As other component, since balance of pressure-sensitive adhering performance can be taken, by rendering Tg 0° C. or lower (usually −100° C. or higher), a cohesive strength and heat resistance improving component such as a sulfonic acid group-containing monomer, a phosphoric acid group-containing monomer, a cyano group-containing monomer, vinyl esters, and an aromatic vinyl compound, and a component having a functional group which improves an adhering force or serves as a crosslinking point, such as a carboxyl group-containing monomer, an acid anhydride group-containing monomer, a hydroxyl group-containing monomer, an amido group-containing monomer, an amino group-containing monomer, an imido group-containing monomer, an epoxy group-containing monomer, and vinyl ethers can be appropriately used. Other components may be used alone, or may be used by mixing two or more kinds.

When (meth)acrylate having an acid functional group such as a carboxyl group, a sulfonic acid group, and a phosphoric acid group is used, it is preferable to adjust an acid value of an acryl-based polymer 29 or less. When an acid value of an acryl-based polymer exceeds 29, there is a tendency that antistatic is deteriorated.

Further, when applied to a surface protecting film, it is preferable to adjust an acid value of an acryl-based polymer 1 or less. When an acid value of an acryl-based polymer exceeds 1, there is a tendency that an adhesive strength is increased with time.

An acid value can be adjusted by a blending amount of (meth)acrylate having an acid functional group. Examples of an acryl-based polymer having a carboxyl group include an acryl-based polymer in which 2-ethylhexyl acrylate is copolymerized with acrylic acid. In this case, by adjusting acrylic acid at 3.7 parts by weight or less relative to a total amount of 2-ethylhexyl acrylate and acrylic acid of 100 parts by weight, the acid value can be a value of 29 or less.

Examples of a sulfonic acid group-containing monomer include styrene sulfonic acid, allylsulfonic acid, 2-(meth)acrylamido-2-methylpropanesulfonic acid, (meth)acrylamidopropanesulfonic acid, sulfopropyl (meth)acrylate, (meth)acryloyloxynaphthalene sulfonic acid, and sodium vinylsulfonate.

Examples of a phosphoric acid group-containing monomer include 2-hydroxyethylacryloyl phosphate.

Examples of a cyano group-containing monomer include acrylonitrile, and methacrylonitrile.

Examples of vinyl esters include vinyl acetate, vinyl propionate, and vinyl laurate.

Examples of an aromatic vinyl compound include styrene, chlorostyrene, chloromethylstyrene, α-methylstyrene, and other substituted styrene.

Examples of a carboxyl group-containing monomer include (meth)acrylic acid, carboxyethyl (meth)acrylate, carboxypentyl (meth)acrylate, itaconic acid, maleic acid, fumaric acid, crotonic acid, and isocrotonic acid.

Examples of an acid anhydride group-containing monomer include maleic anhydride, itaconic anhydride, and an acid anhydride of the above carboxyl group-containing monomer.

Examples of a hydroxyl group-containing monomer include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl acrylate, N-methylol(meth)acrylamide, vinyl alcohol, allyl alcohol, 2-hydroxyethyl vinyl ether, 4-hydroxybutyl vinyl ether, and diethylene glycol monovinyl ether.

Examples of an amido group-containing monomer include acrylamide, methacrylamide, diethylacrylamide, N-vinylpyrrolidone, N,N-dimethylacrylamide, N,N -dimethylmethacrylamide, N,N-diethylacrylamide, N,N-diethylmethacrylamide, N,N'-methylenebisacrylamide, N,N-dimethylaminopropylacrylamide, and N,N -dimethylaminopropylmethacrylamide.

Examples of an amino group-containing monomer include aminoethyl (meth)acrylate, N,N-dimethylaminoethyl (meth)acrylate, N,N-dimethylaminopropyl (meth)acrylate, and (meth)acryloylmorpholine.

Examples of an imido group-containing monomer include cyclohexylmaleimide, isopropylmaleimide, N-cyclohexylmaleimide, and itaconimide.

Examples of an epoxy group-containing monomer include glycidyl (meth)acrylate, methylglycidyl (meth)acrylate, and allylglycidyl ether.

Examples of vinyl ethers include methyl vinyl ether, ethyl vinyl ether, and isobutyl vinyl ether.

The aforementioned other polymerizable monomer components may be used alone, or may be used by mixing two or more kinds. A content as a whole is such that a polymerizable monomer component is less than 50 parts by weight, preferably 0.1 to 20 parts by weight, more preferably 0.5 to 10 parts by weight relative to 100 parts by weight of a total constitutional unit of a (meth)acryl-based polymer. By using the aforementioned other polymerizable monomer components, better interaction with an ionic acid, and better adhering property can be appropriately adjusted.

It is desirable that a (meth)acryl-based polymer used in the present invention has a weight average molecular weight of not less than 100 thousands and not more than 5000 thousands, preferably not less than 200 thousands and not more than 4000 thousands, further preferably not less than 300 thousands and not more than 3000 thousands. When a weight average molecular weight is less than 100 thousands, since a cohesive strength of a pressure-sensitive adhesive composition becomes small, there is a tendency that adhesive residue occurs. On the other hand, when a weight average molecular weight exceeds 5000 thousands, fluidity of a polymer is reduced, and wetting on a polarizing plate becomes insufficient, and there is a tendency that this is a cause for peeling off which is generated between a polarizing plate and a pressure-sensitive adhesive composition layer of a pressure-sensitive adhesive sheet. A weight average molecular weight is obtained by measurement by GPC (gel permeation chromatography).

The acryl-based polymer is obtained by a polymerizing method which is generally used as a procedure of synthesizing an acryl-based polymer such as solution polymerization, emulsion polymerization, bulk polymerization and suspension polymerization. In addition, the resulting polymer may be any of a random copolymer, a block copolymer, and a graft copolymer.

In the pressure-sensitive adhesive of the present invention, a pressure-sensitive adhesive sheet further excellent in heat resistance is obtained, by appropriately crosslinking a base polymer, particularly an acryl-based polymer. As a specific means of a crosslinking method, there is a method using a so-called crosslinking agent in which a compound having a group reactive with a carboxyl group, a hydroxyl group, an amino group or an amido group which is appropriately contained in an acryl-based polymer as a crosslinking point, such as an isocyanate compound, an epoxy compound, a melamine-based resin, and an aziridine compound, is added to react them. Inter alia, mainly from a viewpoint of obtaining an appropriate cohesive strength, an isocyanate compound and an epoxy compound are particularly preferably used. These compounds may be used alone, or may be used by mixing two or more kinds.

Among them, examples of an isocyanate compound include aromatic isocyanate such as tolylene diisocyanate, and xylene diisocyanate, alicyclic isocyanate such as isophorone diisocyanate, and aliphatic isocyanate such as hexamethylene diisocyanate.

More specifically, examples of an isocyanate compound include lower aliphatic polyisocyanates such as butylene diisocyanate, and hexamethylene diisocyanate, alicyclic isocyanates such as cyclopentylene diisocyanate, cyclohexylene diisocyanate, and isophorone diisocyanate, aromatic diisocyanates such as 2,4-tolylene diisocyanate, 4,4'-diphenylmethane diisocyanate, and xylylene diisocyanate, and isocyanate adducts such as trimethylolpropane/tolylene diisocyanate trimer adduct (trade name; Coronate L manufactured by Nippon Polyurethane Industry Co., Ltd.), trimethylolpropane/hexamethylene diisocyanate trimer adduct (trade name; Coronate HL, manufactured by Nippon Polyurethane Industry Co., Ltd.), and isocyanurate entity of hexamethylene diisocyanate (trade name; Coronate HX, manufactured by Nippon Polyurethane Industry Co., Ltd.).

Examples of an epoxy compound include N,N,N',N'-tetraglycidyl-m -xylenediamine (trade name; TETRAD-X, manufactured by Mitsubishi Gas Chemical Company, Inc.) and 1,3-bis(N,N-diglycidylaminomethyl)cyclohexane (trade name; TETRAD-C, manufactured by Mitsubishi Gas Chemical Company, Inc.).

Examples of a melamine-based resin include hexamethylolmelamine.

Examples of an aziridine derivative include trade name HDU, trade name TAZM, and trade name TAZO (all manufactured by Sogoyakko) as a commercially available product. These compounds may be used alone, or may be used by mixing two or more kinds.

An amount of these crosslinking agents to be used is appropriately selected depending on balance between a (meth)acryl-based polymer to be crosslinked and, further usage as a pressure-sensitive adhesive sheet. In order to obtain sufficient heat resistance by a cohesive strength of an acryl pressure-sensitive adhesive, generally, they are contained at an amount of preferably 0.01 to 15 parts by weight, more preferably 0.5 to 10 parts by weight relative to 100 parts by weight of the acryl-based polymer. When a content is less than 0.01 part by weight, crosslinking formation by a crosslinking agent becomes insufficient, a cohesive strength of a pressure-sensitive adhesive composition becomes small, sufficient heat resistance is not obtained in some cases, and there is a tendency that this becomes a cause for adhesive residue. On the other hand, when a content exceeds 15 parts by weight, a cohesive strength of a polymer is great, fluidity is reduced, wetting onto an adherend becomes insufficient, and there is a tendency that this becomes a cause for peeling.

Alternatively, a substantial crosslinking agent as a polyfunctional monomer having two or more radiation reactive unsaturated bonds may be added, and this may be crosslinked by radiation. As a polyfunctional monomer having two or more radiation reactive unsaturated bonds, a polyfunctional monomer component having one or two or more kinds of two or more radiation reactivities which can be crosslinking-treated (cured) by irradiation with radiation, such as a vinyl group, an acryloyl group, a methacryloyl group, and a vinylbenzyl group is used. Generally, a component having 10 or less of radiation reactive unsaturated bonds is preferably used. Polyfunctional monomers may be used alone, or may be used by mixing two or more kinds.

Examples of a polyfunctional monomer include ethylene glycol di(meth)acrylate, diethylene glycol di(meth)acrylate, tetraethylene glycol di(meth)acrylate, neopentyl glycol di(meth)acrylate, 1,6-hexanediol di(meth)acrylate, trimethylolpropane tri(meth)acrylate, pentaerythritol tri(meth)acrylate, dipentaerythritol hexa(meth)acrylate, divinylbenzene, and N,N'-methylenebisacrylamide.

An amount of a polyfunctional monomer to be used is appropriately selected depending on balance with an acryl-based polymer to be crosslinked and, further, usage as a pressure-sensitive adhesive sheet. In order to obtain sufficient heat resistance by a cohesive strength of an acryl pressure-sensitive adhesive, generally, a polyfunctional monomer is preferably blended at 0.1 to 30 parts by weight relative to 100 parts by weight of a (meth)acryl-based polymer. In addition, from a viewpoint of flexibility and adhering property, a polyfunctional monomer is more preferably blended at 10 parts or less by weight relative to 100 parts by weight of a (meth)acryl-based polymer.

Examples of radiation include ultraviolet-ray, laser ray, α ray, β ray, γ ray, X ray, and electron beam and, from a viewpoint of better controllability and handling, and cost, ultraviolet-ray is preferably used. More preferably, ultraviolet-ray having a wavelength of 200 to 400 nm is used. Ultraviolet-ray can be irradiated using a convenient light source such as a high pressure mercury lamp, a microwave excitation-type lamp, and a chemical lamp. When ultraviolet-ray is used as radiation, a photopolymerization initiator is added to an acryl pressure-sensitive adhesive.

A photopolymerization initiator may be a substance generating a radical or a cation by irradiation with ultraviolet-ray having a suitable wavelength which can be triggering of the polymerization reaction, depending on a kind of a radiation reactive component.

Examples of a photoradical polymerization initiator include benzoins such as benzoin, benzoin methyl ether, benzoin ethyl ether, methyl o-benzoylbenzoate-p -benzoin ethyl ether, benzoin isopropyl ether, and α-methylbenzoin, acetophenones such as benzyldimethylketal, trichloroacetophenone, 2,2-diethoxyacetophenone, and 1-hydroxycyclohexylphenylketone, propiophenones such as 2-hydroxy-2-methylpropiophenone, and 2-hydroxy-4'-isopropyl-2-methylpropiophenone, benzophenones such as benzophenone, methylbenzophenone, p-chlorobenzophenone, and p -dimethylaminobenzophenone, thioxanthones such as 2-chlorothioxanthone, 2-ethylthioxanthone, and 2-isopropylthioxanthone, acylphosphine oxides such as bis (2,4,6-trimethylbenzoyl)-phenylphosphine oxide, 2,4,6-trimethylbenzoyldiphenylphosphine oxide, and (2,4,6-trimethylbenzoyl)-(ethoxy)-phenylphosphine oxide, benzil, dibenzosuberone, and α-acyloxime ester.

Examples of a photocation polymerization initiator include onium salts such as an aromatic diazonium salt, an aromatic iodonium salt, and an aromatic sulfonium salt, organometallic complexes such as an iron-allene complex, a titanocene complex, and an arylsilanol-aluminum complex, nitrobenzyl ester, sulfonic acid derivative, phosphoric acid ester, phenolsulfonic acid ester, diazonaphthoquinone, and N-hydroxyimidosulfonate. The photopolymerization initiators may be used alone, or may be used by mixing two or more kinds.

It is preferable that a photopolymerization initiator is blended usually at 0.1 to 10 parts by weight, preferably at 0.2 to 7 parts by weight relative to 100 parts by weight of a (meth)acryl-based polymer.

Further, it is also possible to use a photopolymerization initiation assistant such as amines. Examples of the photopolymerization initiation assistant include 2-dimethylaminoethyl benzoate, dimethylaminoacetophenone, p-dimethylaminobenzoic acid ethyl ester, and p-dimethylaminobenzoic acid isoamyl ester. The photopolymerization initiation assistants may be used alone, or may be used by mixing two or more kinds. It is preferable that a polymerization initiation assistant is blended in a range of 0.05 to 10 parts by weight, further 0.1 to 7 parts by weight relative to 100 parts by weight of an acryl-based polymer.

Further, the previously known various tackifier and surface lubricants, leveling agent, antioxidant, corrosion preventing agent, light stabilizer, ultraviolet absorbing agent, polymerization inhibitor, silane coupling agent, inorganic or organic filler, and the previously known various additives such as powders, particles, and foils of a metal powder, and a pigment may be appropriately added to a pressure-sensitive adhesive composition used in the pressure-sensitive adhesive sheet of the present invention, depending on usage.

On the other hand, a pressure-sensitive adhesive layer in the present invention is such that the aforementioned pressure-sensitive adhesive composition is crosslinked. In addition, the pressure-sensitive adhesive sheet of the present invention is such that such the pressure-sensitive adhesive layer is formed on a support film. Thereupon, it is common that crosslinking of a pressure-sensitive adhesive composition is performed after coating of a pressure-sensitive adhesive composition, and it is also possible to transfer a pressure-sensitive adhesive layer comprising a pressure-sensitive adhesive composition after crosslinking onto a support film.

When a photopolymerization initiator as an optional component is used as described above, the pressure-sensitive adhesive composition is directly coated on a material to be protected, or coated on one side or both sides of a support substrate, and this is irradiated with light, whereby, a pressure-sensitive adhesive layer can be obtained. Usually, a pressure-sensitive adhesive layer is obtained by photopolymerization by irradiating with ultraviolet-ray having irradiance of 1 to about 200 mW/cm$^2$ at a wavelength 300 to 400 nm, at an expose dose of 200 to 4000 mJ/cm$^2$.

A method of forming a pressure-sensitive adhesive layer on a film is not particularly limited, but for example, the layer can be prepared by coating the pressure-sensitive adhesive composition on a support film, and removing a polymerization solvent by drying to form a pressure-sensitive adhesive layer on a support film. Thereafter, aging may be performed for the purpose of adjusting transference of a component of a pressure-sensitive adhesive layer or adjusting a crosslinking reaction. In addition, when a pressure-sensitive adhesive sheet is prepared by coating a pressure-sensitive adhesive layer on a support film, one or more kinds of solvents other than a polymerization solvent may be newly added to the composition so that the composition can be uniformly coated on a support film.

In addition, as a method of forming a pressure-sensitive adhesive layer of the present invention, the known method used for preparing pressure-sensitive adhesive tapes is used. Specifically, examples include a roll coating method, a gravure coating method, a reverse coating method, a roll brushing method, a spray coating method, an air knife coating method, and an extrusion coating method with a die coater.

The pressure-sensitive adhesive sheet of the present invention is such that the pressure-sensitive adhesive layer is coated by coating on one side or both sides of various supports comprising a plastic film such as a polyester film, or a porous material such as a paper and a non-woven fabric at a thickness of usually 3 to 100 μm, preferably about 5 to 50 μm, and this is formed into a sheet or a tape. In particular, in the case of a surface protecting film, it is preferable to use a plastic substrate as a support.

A plastic substrate is not particularly limited as far as it can be formed into a sheet or a film, and examples include a polyolefin film such as polyethylene, polypropylene, poly-1-butene, poly-4-methyl-1-pentene, ethylene.propylene copolymer, ethylene.1-butene copolymer, ethylene-vinyl acetate copolymer, ethylene.ethyl acrylate copolymer, and ethylene.vinyl alcohol copolymer, a polyester film such as polyethylene terephthalate, polyethylene naphthalate, and polybutylene terephthalate, a polyacrylate film, a polystyrene film, a polyamide film such as nylon 6, nylon 6,6, and a partially aromatic polyamide, a polyvinyl chloride film, a polyvinylidene chloride film, and a polycarbonate film. A thickness of the film is usually 5 to 200 μm, preferably about 10 to 100 μm.

A plastic substrate may be subjected to release and anti-staining treatment with a releasing agent of a silicone types, a fluorine types, a long chain alkyl types, or a fatty acid amide types, or a silica powder, easy adhesion treatment such as acid treatment, alkali treatment, primer treatment, corona treatment, plasma treatment, and ultraviolet-ray treatment, or antistatic treatment of coating type, kneading type and deposition type, if necessary.

In addition, it is more preferable that a plastic substrate used in a surface protecting film of the present invention is antistatic-treated. Antistatic treatment given to a plastic substrate is not particularly limited, but for example, a method of providing an antistatic layer on at least one side of a film which is generally used, and a method of kneading a kneading-type antistatic agent into a plastic film are used. As a method of providing an antistatic layer on at least one side of a film, there are a method of coating an antistatic resin consisting of an antistatic agent and a resin component, or an electrically conductive resin containing an electrically conductive polymer or an electrically conductive substance, and a method of depositing or plating an electrically conductive substance.

Examples of an antistatic agent contained in an antistatic resin include a cation-type antistatic agent having a cationic functional group such as a quaternary ammonium salt, a pyridinium salt, and a primary, secondary or tartiary amino group, an anion-type antistatic agent having an anionic functional group such as a sulfonate salt or a sulfate ester salt, a phosphonate salt, and a phosphate ester salt, an amphoteric-type antistatic agent such as alkylbetaine and a derivative thereof, imidazoline and a derivative thereof, and alanine and a derivative thereof, a nonion-type antistatic agent such as aminoalcohol and a derivative thereof, glycerin and a derivative thereof, and polyethylene glycol and a derivative thereof, and an ionic electrically conductive polymer obtained by polymerizing or copolymerizing a monomer having the aforementioned cation-type, anion-type, or amphoteric-type ionic electrically conductive group. These compounds may be used alone, or may be used by mixing two or more kinds of them.

Specifically, examples of a cation-type antistatic agent include a (meth)acrylate copolymer having a quaternary ammonium group such as alkyltrimethylammonium salt, acyloylamidopropyltrimethylammonium methosulfate, alkylbenzylmethylammonium salt, choline acyl chloride, and polydimethylaminoethyl methacrylate, a styrene copolymer having a quaternary ammonium group such as polyvinylbenzyltrimethylammonium chloride, a diallylamine copolymer having a quaternary ammonium group such as polydiallyldimethylammonium chloride. These compounds may be used alone, or may be used by mixing two or more kinds.

Examples of an anion-type antistatic agent include alkylsulfonate salt, alkylbenzenesulfonate salt, alkylsulfate ester salt, alkylethoxysulfate ester salt, alkylphosphate ester salt, and sulfonic acid group-containing styrene copolymer. These compounds may be used alone, or may be used by mixing two or more kinds.

Examples of an amphoteric-type antistatic agent include alkylbetaine, alkylimidazoliumbetaine, and carbobetaine graft copolymer. These compounds may be used alone, or two or more kinds may be used by mixing.

Examples of a nonionic-type antistatic agent include fatty acid alkylolamide, di(2-hydroxyethyl)alkylamine, polyoxyethylene alkylamine, fatty acid glycerin ester, polyoxyethylene glycol fatty acid ester, sorbitan fatty acid ester, polyoxysorbitan fatty acid ester, polyoxyethylene alkyl phenyl ether, polyoxyethylene alkyl ether, polyethylene glycol, polyoxyethylene diamine, a copolymer consisting of polyether, polyester and polyamide, and methoxypolyethylene glycol (meth)

acrylate. These compounds may be used alone, or two or more kinds may be used by mixing.

Examples of an electrically conductive polymer include polyaniline, polypyrrole, and polythiophene. These electrically conductive polymers may be used alone, or may be used by mixing two or more kinds.

Examples of an electrically conductive substance include tin oxide, antimony oxide, indium oxide, cadmium oxide, titanium oxide, zinc oxide, indium, tin, antimony, gold, silver, copper, aluminum, nickel, chromium, titanium, iron, cobalt, copper iodide, and an alloy or a mixture thereof. These electrically conductive substances may be used alone, or may be used by mixing two or more kinds.

As a resin component used in an antistatic resin and an electrically conductive resin, a general-use resin such as polyester, acryl, polyvinyl, urethane, melamine and epoxy is used. In the case of a polymer-type antistatic agent, a resin component may not be contained. In addition, an antistatic resin component may also contain methylolated or alkylolated melamine types, urea types, glyoxal types, and acrylamide types compounds, an epoxy compound, or an isocyanate compound as a crosslinking agent.

As a method of forming an antistatic layer, for example, the layer is formed by diluting the antistatic resin, the electrically conductive polymer, or the electrically conductive resin with a solvent such as an organic solvent and water, and coating this coating solution on a plastic film, followed by drying.

Examples of an organic solvent used in formation of the antistatic layer include methyl ethyl ketone, acetone, ethyl acetate, tetrahydrofuran, dioxane, cyclohexanone, n-hexane, toluene, xylene, methanol, ethanol, n-propanol, and isopropanol. These solvents may be used alone, or may be used by mixing two or more kinds.

Regarding a coating method in the aforementioned formation of an antistatic layer, the known coating method is appropriately used, and specific examples include a roll coating method, a gravure coating method, a reverse coating method, a roll brushing method, a spray coating method, an air knife coating method, an immersion method and a curtain coating method.

A thickness of the antistatic resin layer, the electrically conductive polymer or the electrically conductive resin is usually about 0.01 to 5 µm, preferably about 0.03 to 1 µm.

Examples of a method of depositing or plating an electrically conductive substance include a vacuum deposition method, a sputtering method, an ion plating method, a chemical deposition method, a spray thermal degradation method, a chemical plating method, and an electric plating method.

A thickness of the electrically conductive substance layer is usually 20 to 1000 Å, preferably 50 to 5000 Å.

As a kneading-type antistatic agent, the aforementioned antistatic agent is appropriately used. A blending amount of a kneading-type antistatic agent is 20% by weight or less, preferably in a range of 0.05 to 10% by weight relative to a total weight of a plastic film. A kneading method is not particularly limited as far as it is a method capable of uniformly mixing the antistatic agent into a resin used in a plastic film and, for example, a heating roll, a Banbury mixer, a pressure kneader, and a twin-screw kneader are used.

A plastic film may be subjected to release or anti-staining treatment with a releasing agent of a silicone types, a fluorine types, a long chain alkyl types or a fatty acid amide types, or a silica powder, or easy adhesion treatment such as acid treatment, alkali treatment, primer treatment, corona treatment, plasma treatment, and ultraviolet-ray treatment, if necessary.

For the purpose of protecting a pressure-sensitive adhesive surface of the pressure-sensitive adhesive sheet of the present invention, a separator can be applied on a pressure-sensitive adhesive surface, if necessary. Examples of a substrate constituting a separator include a paper and a plastic film and, from a viewpoint of excellent surface smoothness, a plastic film is preferably used.

The film is not particularly limited as far as it is a film which can protect the pressure-sensitive adhesive layer, and examples include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

A thickness of the film is usually about 5 to 200 µm, preferably about 10 to 100 µm. A pressure-sensitive adhesive layer applying surface of the film is appropriately subjected to releasing agent treatment with silicone types, fluorine types, long chain alkyl types or fatty acid amide-types releasing agent, or a silica powder.

A pressure-sensitive adhesive composition and a pressure-sensitive adhesive sheet using the present invention is used in plastic products on which static electricity is particularly easily generated and, inter alia, particularly, can be used as a surface protecting film which is used for the purpose of protecting a surface of an optical member such as a polarizing plate, a wavelength plate, an optical compensating film, a light diffusion sheet, and a reflection sheet.

EXAMPLES

Examples specifically showing the feature and the effect of the present invention will be explained below. Assessment items in Examples were measured as follows.

<Measurement of Acid Value>

An acid value was measured using an automatic titration apparatus (COM-550 manufactured by Hiranuma Sangyo), and was obtained by the following equation.

$$A = \{(Y-X) \times f \times 5.611\}/M$$

A; acid value
Y; titration amount (ml) of sample solution
X; titration amount (ml) of solution of only 50 g of mixed solvent
f; factor of titrating solution
M; weight (g) of polymer sample Measurement conditions are as follows:

Sample solution: About 0.5 g of a polymer sample was dissolved in 50 g of a mixed solvent (toluene/2-propanol/distilled water=50/49.5/0.5, weight ratio) to obtain a sample solution. Titration solution: 0.1N 2-propanolic potassium hydroxide solution (manufactured by Wako Pure Chemical Industries, Ltd.; for petroleum product neutralization value test) Electrode: Glass electrode; GE-101, comparative electrode; RE-201

Measurement mode: Petroleum product neutralization value test 1

<Measurement of Molecular Weight>

A molecular weight was measured using a GPC apparatus (HLC-8220GPC manufactured by Tosoh Corporation), and obtained as a polystyrene conversion value. Measurement condition is as follows:

Sample concentration: 0.2% by weight (THF solution)
Sample injection amount: 10 µl
Eluent: THF
Flow rate: 0.6 ml/min
Measurement temperature: 40° C.

Column:
Sample column; TSKguardcolumn SuperHZ-H (1)+ TSKgel SuperHZM-H(2) Reference column; TSKgel SuperH-RC (1)
Detector: Refractive index detector <Measurement of Glass Transition Temperature>

Regarding a glass transition temperature Tg (° C.), as a glass transition temperature Tgn (° C.) of a homopolymer for each monomer, the following reference value was used, and the temperature was obtained by the following equation.

Equation: $1/(Tg+273)=\Sigma[Wn/(Tgn+273)]$

[wherein, Tg (° C.) indicates a glass transition temperature of a copolymer, Wn(−) indicates a weight fraction of each monomer, Tgn (° C.) indicates a glass transition temperature of a homopolymer for each monomer, and n indicates a kind of each monomer]

2-Ethylhexyl acrylate: −70° C.
Isononyl acrylate: −82° C.
2-Hydroxyethyl acrylate: −15° C.
Ethoxy-diethylene glycol acrylate: −70° C.

<Ionic Liquid Structural Analysis>

Ionic liquid structural analysis was performed by NMR measurement, XRF measurement, and FT-IR measurement.

[NMR Measurement]

NMR measurement was performed using a nuclear magnetic resonance apparatus (EX-400 manufactured by JEOL. Ltd.) under the following measuring conditions.

Observation frequency: 400 MHz ($^1$H), 100 MHz ($^{13}$C)
Measurement solvent: acetone-$d_6$
Measurement temperature: 23° C.

[XRF Measurement]

XRF measurement was performed using a scanning fluorescent X-ray analyzing apparatus (ZSX-100e manufactured by Rigaku Corporation) under the following measuring conditions:

Measuring method: filter paper method
X-ray source: Rh

[FT-IR Measurement]

FT-IR measurement was performed using an infrared spectrophotometer (Magna-560 manufactured by Nicolet) under the following measuring conditions.

Measuring method: ATR method
Detector: DTGS
Resolution: 4.0 cm$^{-1}$
Accumulation times: 64

First, Examples when an ethylene oxide group-containing compound is used will be explained.

Preparation Example 1

Acryl-based Polymer (A)

A four-neck flask equipped with a stirring wing, a thermometer, a nitrogen gas introducing tube, and a condenser was charged with 200 parts by weight of 2-ethylhexyl acrylate, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for 6 hours while maintaining a liquid temperature in a flask at around 65° C., to prepare a solution (40% by weight) of an acryl-based polymer (A). This acryl-based polymer (A) had Tg=−68° C., a weight average molecular weight of 500 thousands, and an acid value of 0.0.

Preparation Example 2

Acryl-based Polymer (B)

A four-neck flask equipped with a stirring wing, a thermometer, a nitrogen gas introducing tube, and a condenser was charged with 200 parts by weight of isononyl acrylate, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, a polymerization reaction was performed for 6 hours while maintaining a liquid temperature in a flask at about 65° C., to prepare a solution (40% by weight) of an acryl-based polymer (B). This acryl-based polymer (B) had Tg=−80° C., a weight average molecular weight of 540 thousands, and an acid value of 0.0.

Preparation Example 3

Acryl-based Polymer (C)

A four-neck flask equipped with a stirring wing, a thermometer, a nitrogen gas introducing tube, and a condenser was charged with 200 parts by weight of 2-ethylhexyl acrylate, 0.1 part by weight of 1-hydroxycyclohexyl phenyl ketone [Irgacure 184 manufactured by Ciba Specialty Chemicals], and 0.1 part by weight of benzyldimethylketal [Irgacure 651 manufactured by Ciba Specialty Chemicals], a nitrogen gas was introduced while mildly stirring, and a polymerization reaction was performed for about 3 minutes by irradiation with ultraviolet-ray with a high pressure mercury lamp (SHL-100UVQ-2 manufactured by Toshiba Lighting and Technology corporation), to prepare a solution of an acryl-based polymer (C) which is a partially polymerized polymer (syrup-like) of a polymerization ratio of 10%. This acryl-based polymer (C) had Tg=−70° C., a weight average molecular weight of 2200 thousands, and an acid value of 0.0.

Preparation Example 4

Acryl-based Polymer (D)

A four-neck flask equipped with a stirring wing, a thermometer, a nitrogen gas introducing tube, and a condenser was charged with 140 parts by weight of 2-ethylhexyl acrylate, 60 parts by weight of ethoxy-diethylene glycol acrylate, 8 parts by weight of 2-hydroxyethyl acrylate, 0.4 part by weight of 2,2'-azobisisobutyronitrile as a polymerization initiator, 218 parts by weight of ethyl acetate, and 94 parts by weight of toluene, a nitrogen gas was introduced while mildly stirring, and a polymerization reaction was performed for about 6 hours while maintaining a liquid temperature in a flask at about 65° C., to prepare a solution (40% by weight) of an acryl-based polymer (D). This acryl-based polymer (D) had Tg=−68° C., a weight average molecular weight of 500 thousands, and an acid value of 0.0.

Preparation Example 5

Acryl-based Polymer (E)

To a four-neck flask equipped with a stirring wing, a thermometer, a nitrogen gas introducing tube, and a condenser were added 120 parts by weight of toluene, and 10 parts by weight of 2,2'-azobisisobutyronitrile, a nitrogen gas was introduced while mildly stirring, and a liquid temperature was set to be 85° C. 50 parts by weight of 2-ethylhexyl acrylate, 50 parts by weight of ethoxy-diethylene glycol acrylate, 10 parts by weight of α-methylstyrene dimer were gradually added over 2 hours while maintaining a liquid temperature at 85° C., and a polymerization reaction was performed. After completion of addition, a polymerization reaction was performed for 1 hour while maintaining a liquid temperature at 85° C., to prepare a solution (42% by weight) of an acryl-based polymer (E). A solution (42% by weight) of an acryl-based polymer (E) was dried at 130° C. for 1 hour, to prepare an acryl-based polymer (E) (100% by weight) having an ethylene glycol group-containing acrylate rate of 50% by weight. A weight average molecular weight of this acryl-based polymer (E) was 3000.

Preparation Example 6

Antistatic Agent (A)

A four-neck flask equipped with a stirring wing, a thermometer, a nitrogen gas introducing tube, and a condenser was charged with 5 parts by weight of N,N-diethyl-N-methyl-N-(2-methoxyethyl)ammonium bis(trifluoromethanesulfonyl)imide (liquid at 25° C.), 5 parts by weight of a block copolymer (number average molecular weight 2,000, ethylene glycol rate 50% by weight) of polypropylene glycol-polyethylene glycol-polypropylene glycol, and 90 parts by weight of ethyl acetate, and mixing and stirring were performed for 30 minutes while maintaining a liquid temperature in a flask at around room temperature (25° C.) to prepare a solution (10% by weight) of an antistatic agent (A).

Preparation Example 7

Antistatic Agent (B)

A four-neck flask equipped with a stirring wing, a thermometer, a nitrogen gas introducing tube, and a condenser was charged with 5 parts by weight of N,N-diethyl-N-methyl-N-(2-methoxyethyl)ammonium bis(trifluoromethanesulfonyl)imide (liquid at 25° C.), 5 parts by weight of a block copolymer (number average molecular weight 2,000, ethylene glycol rate 10% by weight) of polyethylene glycol-polypropylene glycol-polyethylene glycol, and 90 parts by weight of ethyl acetate, and mixing and stirring were performed for 30 minutes while maintaining a liquid temperature in a flask at around room temperature (25° C.), to prepare a solution (10% by weight) of an antistatic agent (B).

Preparation Example 8

Antistatic Agent (C)

A four-neck flask equipped with a stirring wing, a thermometer, a nitrogen gas introducing tube, and a condenser was charged with 5 parts by weight of 1-butyl-3-methylpyridinium trifluoromethanesulfonate (liquid at 25° C.), 5 parts by weight of a block copolymer (number average molecular weight 2,000, ethylene glycol rate 50% by weight) of polypropylene glycol-polyethylene glycol-polypropylene glycol, and 90 parts by weight of ethyl acetate, and mixing and stirring were performed for 30 minutes while maintaining a liquid temperature in a flask at around room temperature (25° C.), to prepare a solution (10% by weight) of an antistatic agent (C).

Preparation Example 9

Antistatic Agent (D)

A four-neck flask equipped with a stirring wing, a thermometer, a nitrogen gas introducing tube, and a condenser was charged with 5 parts by weight of 1-butyl-3-methylpyridiniym bis(trifluoromethanesulfonyl)imide (liquid at 25° C.), 5 parts by weight of a block copolymer (number average molecular weight 2,000, ethylene glycol rate 50% by weight) of polypropylene-glycol-polyethylene glycol-polypropylene glycol, and 90 parts by weight of ethyl acetate, and mixing and stirring were performed for about 30 minutes while maintaining a liquid temperature in a flask at around room temperature (25° C.), to prepare a solution (10% by weight) of an antistatic agent (D).

Preparation Example 10

Antistatic Agent (E)

A four-neck flask equipped with a stirring wing, a thermometer, a nitrogen gas introducing tube, and a condenser was charged with 5 parts by weight of 1-butyl-3-methylpyridinium trifluoromethanesulfonate (liquid at 25° C.), 5 parts by weight of polypropylene glycol (number average molecular weight 700), and 90 parts by weight of ethyl acetate, and mixing and stirring were performed for 30 minutes while maintaining a liquid temperature in a flask at around room temperature (25° C.) to prepare a solution (10% by weight) of an antistatic agent (E).

Preparation Example 11

Antistatic Agent (F)

A four-neck flask equipped with a stirring wing, a thermometer, and a condenser was charged with 0.2 part by weight of lithium perchlorate (melting point 236° C.), 9.8 parts by weight of polypropylene glycol (diol type, number average molecular weight 2,000), and 10 parts by weight of ethyl acetate, and mixing and stirring were performed for 2 hours while maintaining a liquid temperature in a flask at around 80° C., to prepare a solution (50% by weight) of an antistatic agent (F).

Preparation Example 12

Antistatic Agent (G)

A four-neck flask equipped with a stirring wing, a thermometer, a nitrogen gas introducing tube, and a condenser was charged with 5 parts by weight of N,N-diethyl-N-methyl-N-(2-methoxyethyl)ammonium bis(trifluoromethanesulfonyl)imide (liquid at 25° C.), 5 parts by weight of an acryl-based polymer (E), and 90 parts by weight of ethyl acetate, and mixing and stirring were performed for about 30 minutes while maintaining a liquid temperature in a flask at around room temperature (25° C.), to prepare a solution (10% by weight) of an antistatic agent (G).

Preparation Example 13

Antistatic Agent (H)

A four-neck flask equipped with a stirring wing, a thermometer, a nitrogen gas introducing tube, and a condenser was charged with 5 parts by weight of an alicyclic amine-based ionic liquid (trade name: IL-A1, manufactured by KOEI CHEMICAL CO., LTD.; liquid at 25° C.), 5 parts by weight of a block copolymer (number average molecular weight 2,000, ethylene glycol rate 10% by weight) of polyethylene glycol-polypropylene glycol-polyethylene glycol, and 90 parts by weight of ethyl acetate, and mixing and stirring were performed for about 30 minutes while maintaining a liquid temperature in a flask at around room temperature (25° C.), to prepare a solution (10% by weight) of an antistatic agent (H).

Preparation Example 14

Antistatic-Treated Film

An antistatic agent solution was prepared by diluting 10 parts by weight of an antistatic agent [Microsolver RMd-142 manufactured by Solvex, a main component is tin oxide and polyester resin] with a mixed solvent consisting of 30 parts by weight of water and 70 parts by weight of methanol. The resulting antistatic agent solution was coated on a polyethylene terephthalate (PET) film (thickness 38 µm) using a Meyer bar, and this was dried at 130° C. for 1 minute to remove a solvent, to form an antistatic layer (thickness 0.2 µm), thereby, an antistatic-treated film was prepared.

Example 1-1

(Preparation of Pressure-sensitive Adhesive Composition)

A solution (40% by weight) of an acryl-based polymer (A) was diluted to 20% by weight with ethyl acetate, to 100 parts by weight of this solution were added 1 part by weight of a solution (10% by weight) of an antistatic agent (A), 0.8 part by weight of an isocyanurate entity of hexamethylene diisocyanate (Coronate HX manufactured by Nippon Polyurethane Industry Co., Ltd.), and 0.4 part by weight of dibutyltin dilaurate (1 weight % ethyl acetate solution) as a crosslinking catalyst, and mixing and stirring were performed for about 1 minute under a room temperature (25° C.) to prepare an acryl pressure-sensitive adhesive solution (1).

(Preparation of Pressure-sensitive Adhesive Sheet)

The aforementioned acryl pressure-sensitive adhesive solution (1) was coated on a side opposite to an antistatic-treated side of the antistatic-treated film, and this was heated at 110° C. for 3 minutes to form a pressure-sensitive adhesive layer having a thickness of 20 µm. Then, a silicone-treated side of a polyethylene terephthalate film of a thickness of 25 µm, having a one silicone-treated side was applied on a surface of the pressure-sensitive adhesive layer to prepare a pressure-sensitive adhesive sheet.

Example 1-2

(Preparation of Pressure-sensitive Adhesive Composition)

According to the same manner as that of Example 1-1 except that 1 part by weight of a solution (10% by weight) of an antistatic agent (B) was used in place of 1 part by weight of a solution of an antistatic agent (A), an acryl pressure-sensitive adhesive solution (2) was prepared.

(Preparation of Pressure-sensitive Adhesive Sheet)

According to the same manner as that of Example 1-1 except that an acryl pressure-sensitive adhesive solution (2) was used in place of an acryl pressure-sensitive adhesive solution (1), a pressure-sensitive adhesive sheet was prepared.

Example 1-3

(Preparation of Pressure-sensitive Adhesive Composition)

According to the same manner as that of Example 1-1 except that 2 parts by weight of a solution (10% by weight) of an antistatic agent (C) was used in place of 1 part by weight of a solution of an antistatic agent (A), an acryl pressure-sensitive adhesive solution (3) was prepared.

(Preparation of Pressure-sensitive Adhesive Sheet)

According to the same manner as that of Example 1-1 except that an acryl pressure-sensitive adhesive solution (3) was used in place of an acryl pressure-sensitive adhesive solution (1), a pressure-sensitive adhesive sheet was prepared.

Example 1-4

(Preparation of Pressure-sensitive Adhesive Composition)

According to the same manner as that of Example 1-1 except that 2 parts by weight of a solution (10% by weight) of an antistatic agent (D) was used in place of 1 part by weight of a solution of an antistatic agent (A), an acryl pressure-sensitive adhesive solution (4) was prepared.

(Preparation of Pressure-sensitive Adhesive Sheet)

According to the same manner as that of Example 1-1 except that an acryl pressure-sensitive adhesive solution (4) was used in place of an acryl pressure-sensitive adhesive solution (1), a pressure-sensitive adhesive sheet was prepared.

Example 1-5

(Preparation of Pressure-sensitive Adhesive Composition)

According to the same manner as that of Example 1-4 except that 100 parts by weight of a solution obtained by diluting a solution (40% by weight) of an acryl-based polymer (B) to 20% by weight with ethyl acetate was used in place of 100 parts by weight of a solution obtained by diluting a solution (40% by weight) of an acryl-based polymer (A) to 20% by weight with ethyl acetate, an acryl pressure-sensitive adhesive solution (5) was prepared.

(Preparation of Pressure-sensitive Adhesive Sheet)

According to the same manner as that of Example 1-1 except that an acryl pressure-sensitive adhesive solution (5) was used in place of an acryl pressure-sensitive adhesive solution (1), a pressure-sensitive adhesive sheet was prepared.

Example 1-6

(Preparation of Pressure-sensitive Adhesive Composition)

To 100 parts by weight of a solution of an acryl-based polymer (C) were added 0.15 part by weight of N,N-diethyl-N-methyl-N-(2-methoxyethyl)ammonium bis(trifluoromethanesulfonyl)imide (liquid at 25° C.), and 0.15 part by weight of a block copolymer (number average molecular weight 2,000, ethylene glycol rate 50% by weight) of polypropylene glycol-polyethylene glycol-polypropylene glycol, mixing and stirring were performed for about 1 hour under a room temperature (25° C.), 1.5 parts by weight of trimethylolpropane triacrylate as a polyfunctional monomer, and 0.1 part by weight of benzyldimethylketal [Irgacure 651 manufactured by Ciba Specialty Chemicals] as a polymerization initiator were added, mixing and stirring were performed for about 1 minute under a room temperature (25° C.) to prepare an acryl pressure-sensitive adhesive solution (6).

(Preparation of Pressure-sensitive Adhesive Sheet)

The acryl pressure-sensitive adhesive solution (6) was coated on a side opposite to an antistatic-treated side of the antistatic-treated film to form a pressure-sensitive adhesive layer having a thickness of 20 μm. Then, a silicone-treated side of a polyethylene terephthalate film of a thickness of 25 μm, having one silicone-treated side was applied on a surface of the pressure-sensitive adhesive layer. This film sheet was irradiated with ultraviolet-ray (irradiance 37 mW/cm$^2$, exposure dose 660 mJ/cm$^3$) with a high pressure mercury lamp (UVL-4000-N manufactured by Ushio Inc.), to prepare a pressure-sensitive adhesive sheet.

Example 1-7

(Preparation of Pressure-sensitive Adhesive Composition)

A solution (40% by weight) of an acryl-based polymer (A) was diluted to 20% by weight with ethyl acetate, to 100 parts by weight of this solution were added 2 parts by weight of a solution (10% by weight) of an antistatic agent (G), 0.6 part by weight of an isocyanurate entity of hexamethylene diisocyanate (Coronate HX manufactured by Nippon Polyurethane Industry Co., Ltd.), and 0.4 part by weight of dibutyltin dilaurate (1% by weight ethyl acetate solution) as a crosslinking catalyst, and mixing and stirring were performed for about 1 minute under a room temperature (25° C.) to prepare an acryl pressure-sensitive adhesive solution (7).

(Preparation of Pressure-sensitive Adhesive Sheet)

According to the same manner as that of Example 1-1 except that an acryl pressure-sensitive adhesive solution (7) was used in place of an acryl pressure-sensitive adhesive solution (1), a pressure-sensitive adhesive sheet was prepared.

Example 1-8

(Preparation of Pressure-sensitive Adhesive Composition)

A solution (40% by weight) of an acryl-based polymer (A) was diluted to 20% by weight with ethyl acetate, to 100 parts by weight of this solution were added 1.6 parts by weight of a solution (10% by weight) of an antistatic agent (H), 0.3 part by weight of an isocyanurate entity of hexamethylene diisocyanate (Coronate HX manufactured by Nippon Polyurethane Industry Co., Ltd.), and 0.4 part by weight of dibutyltin dilaurate (1% by weight ethyl acetate solution) as a crosslinking catalyst, and mixing and stirring were performed for about 1 minute under a room temperature (25° C.) to prepare an acryl pressure-sensitive adhesive solution (8) was prepared.

(Preparation of Pressure-sensitive Adhesive Sheet)

According to the same manner as that of Example 1-1 except that an acryl pressure-sensitive adhesive solution (8) was used in place of an acryl pressure-sensitive adhesive solution (1), a pressure-sensitive adhesive sheet was prepared.

Comparative Example 1-1

According to the same manner as that of Example 1-1 except that 0.2 part by weight of 1-butyl-3-methylpyridinium trifluoromethanesulfonate (liquid at 25° C.) was used in place of 1 part by weight of a solution of an antistatic agent (A), an acryl pressure-sensitive adhesive solution (9) was prepared. According to the same manner as that of Example 1-1 except that this acryl pressure-sensitive adhesive solution (9) was used as an acryl pressure-sensitive adhesive solution, a pressure-sensitive adhesive sheet was prepared.

Comparative Example 1-2

According to the same manner as that of Example 1-1 except that 0.05 part by weight of N,N-diethyl-N-methyl-N-(2-methoxyethyl)ammonium bis(trifluoromethanesulfonyl)imide (liquid at 25° C.) was used in place of 1 part by weight of a solution of an antistatic agent (A), an acryl pressure-sensitive adhesive solution (10) was prepared. According to the same manner as that of Example 1-1 except that this acryl pressure-sensitive adhesive solution (10) was used as an acryl pressure-sensitive adhesive solution, a pressure-sensitive adhesive sheet was prepared.

Comparative Example 1-3

According to the same manner as that of Example 1-1 except that 0.2 part by weight of 1-butyl-3-methylpyridinium bis(trifluoromethanesulfonyl)imide (liquid at 25° C.) was used in place of 1 part by weight of a solution of an antistatic agent (A), an acryl pressure-sensitive adhesive solution (11) was prepared. According to the same manner as that of Example 1-1 except that this acryl pressure-sensitive adhesive solution (11) was used as an acryl pressure-sensitive adhesive solution, a pressure-sensitive adhesive sheet was prepared.

Comparative Example 1-4

According to the same manner as that of Example 1-1 except that 2 parts by weight of a solution (10% by weight) of an antistatic agent (E) was used in place of 1 part by weight of a solution of an antistatic agent (A), an acryl pressure-sensitive adhesive solution (12) was prepared. According to the same manner as that of Example 1-1 except that this acryl pressure-sensitive adhesive solution (12) was used as an acryl pressure-sensitive adhesive solution, a pressure-sensitive adhesive sheet was prepared.

Comparative Example 1-5

(Preparation of Pressure-sensitive Adhesive Composition)

To 100 parts by weight of a solution obtained by diluting a solution (40% by weight) of an acryl-based polymer (A) to 20% by weight with ethyl acetate were added 4 parts by weight of a solution (50% by weight) of an antistatic agent (F), 0.53 part by weight of a trimethylolpropane/tolylene diisocyanate trimer adduct (Coronate L manufactured by Nippon Polyurethane Industry Co., Ltd.), and 0.4 part by weight of dibutyltin dilaurate (1 weight % ethyl acetate solution) as a crosslinking catalyst, and mixing and stirring were performed for about 1 minute under a room temperature (25° C.) to prepare an acryl pressure-sensitive adhesive solution (13).

(Preparation of Pressure-sensitive Adhesive Sheet)

According to the same manner as that of Example 1-1 except that this acryl pressure-sensitive adhesive solution (13) was used as an acryl pressure-sensitive adhesive solution, a pressure-sensitive adhesive sheet was prepared.

Comparative Example 1-6

(Preparation of Pressure-sensitive Adhesive Composition)

A solution (40% by weight) of an acryl-based polymer (D) was diluted to 20% by weight with ethyl acetate, to 100 parts by weight of this solution were added 0.2 part by weight of N,N-diethyl-N-methyl-N-(2-methoxyethyl)ammonium bis(trifluoromethanesulfonyl)imide (liquid at 25° C.), 0.8 part by weight of an isocyanurate entity of hexamethylene diisocyanate (Coronate HX manufactured by Nippon Polyurethane Industry Co., Ltd.), and 0.4 part by weight of dibutyltin dilaurate (1 weight % ethyl acetate solution) as a crosslinking catalyst, mixing and stirring were performed for about 1 minute under a room temperature (25° C.) to prepare an acryl pressure-sensitive adhesive solution (14).

(Preparation of Pressure-sensitive Adhesive Sheet)

According to the same manner as that of Example 1-1 except that this acryl pressure-sensitive adhesive solution (14) was used as an acryl pressure-sensitive adhesive solution, a pressure-sensitive adhesive sheet was prepared.

Regarding the pressure-sensitive adhesive sheets obtained in the aforementioned Examples and Comparative Examples, a peeling electrification voltage, occurrence of peeling off and an adhesive strength were assessed by the following procedure.

[Peeling Electrification Voltage]

A pressure-sensitive adhesive sheet is cut into a size of a width 70 mm and a length 130 mm, a separator is peeled, and this is adhered to a surface of a polarizing plate [SEG1224DUARC150T manufactured by Nitto Denko; width 70 mm, length 100 mm] having a surface treated with a fluorine compound, which has been applied to a pre-electricity-removed acryl plate of a thickness 1 mm, a width 70 mm, and a length 100 mm, with a hand roller, so that one end is protruded by 30 mm. After allowing to stand for one day under the environment of 23° C.×50% RH, a sample is set at a prescribed position as shown in FIG. 1. One end protruding by 30 mm is fixed to an automatic winding machine, and a sample is peeled at a peeling angle of 1500 and a peeling rate of 10 m/min. A voltage of a surface of a polarizing plate which is generated thereupon was measured with an electrostatic voltmeter [KSD-0103 manufactured by Kasuga Denki, Inc.] fixed at a prescribed position. Measurement was performed under the environment of 23° C.×50% RH.

[Occurrence of Peeling Off]

A sample was obtained by laminating a pressure-sensitive adhesive sheet on a polarizing plate [SEG1224DUARC150T manufactured by Nitto Denko] having a surface treated with a fluorine resin at a pressure of 0.25 MPa, the sample was cut into a size of width 30 mm and a length 30 mm, and a separator applied to a polarizing plate side is peeled. This is adhered to a slide glass (Matsunami Glass Ind. Ltd., Suien polishing) having a size of thickness 1.3 mm, width 65 mm and length 165 mm with a hand roller to obtain a sample for assessment. After this is allowed to stand for one day under the environment of 23° C., autoclave treatment is performed for 40 minutes under the environment of 50° C.×5 atm. Thereafter, after allowing to stand for 2 hours under the environment of 80° C., whether a pressure-sensitive adhesive sheet is peeled off from a polarizing plate or not was confirmed with naked eyes. Assessment criteria was such that no perception of occurrence of peeling off was ○, and perception of occurrence of peeling off was x.

[Adhesive Strength Measurement]

A triacetylcellulose film [Fujitack manufactured by Fuji Photo Film Co., Ltd.] having a thickness of 90 µm was cut into a width 70 mm and a length 100 mm, and this was immersed in an aqueous sodium hydroxide solution (10% by weight) at 60° C. for 1 minute, and washed with distilled water to prepare an adherend. After the adherend was allowed to stand for one day under the environment of 23° C.×50% RH, a pressure-sensitive adhesive sheet which had been cut into a size of a width 25 mm and a length 100 mm was laminated thereon at a pressure of 0.25 MPa to prepare a sample for assessment. After lamination, the sample was allowed to stand for 30 minutes, and an adhesive strength when peeled at a peeling rate of 10 m/min and a peeling angle of 180° was measured with a universal tensile tester. Measurement was performed under the environment of 23° C.×50% RH.

The above results are shown in Table 1.

TABLE 1

|  | Peeling electrification voltage [kV] | Occurrence of peeling off | Adhesive strength [N/25 mm] |
| --- | --- | --- | --- |
| Example 1-1 | −0.1 | ○ | 0.6 |
| Example 1-2 | −0.3 | ○ | 0.6 |
| Example 1-3 | 0.0 | ○ | 0.8 |
| Example 1-4 | 0.0 | ○ | 0.8 |
| Example 1-5 | 0.0 | ○ | 0.8 |
| Example 1-6 | 0.0 | ○ | 0.7 |
| Example 1-7 | −0.2 | ○ | 0.5 |
| Example 1-8 | −0.1 | ○ | 1.4 |
| Comparative Example 1-1 | −1.4 | ○ | 0.5 |
| Comparative Example 1-2 | −0.8 | ○ | 0.6 |
| Comparative Example 1-3 | −1.4 | ○ | 0.5 |
| Comparative Example 1-4 | −1.1 | ○ | 0.8 |
| Comparative Example 1-5 | 0.0 | x | 0.5 |
| Comparative Example 1-6 | −0.8 | ○ | 0.4 |

As apparent from the results of the Table 1, it was made clear that, in pressure-sensitive adhesive sheets of Examples 1-1 to 1-8 of the present invention, a peeling electrification voltage on a polarizing plate was suppressed, and peeling off did not occur. To the contrary, in Comparative Examples 1-1, 1-2, 1-3 and 1-6 in which an ethylene oxide group-containing compound was not contained, the result was obtained that a peeling electrification voltage on a polarizing plate having a surface treated with a fluorine compound was high. In addition, in Comparative Examples 1-4 using polyether polyol having a content rate of an ethylene oxide group of 0% by weight, the result was obtained that a peeling electrification voltage on a polarizing plate having a surface treated with a fluorine compound was high. Further, in Comparative Example 1-5 using an antistatic agent consisting of polyether polyol and an alkali metal salt, a peeling electrification voltage on a polarizing plate was suppressed low, but occurrence of peeling off was perceived. Like this, in pressure-sensitive adhesive sheets of Comparative Examples 1-1 to 1-6, both of suppression of a peeling electrification voltage, and suppression of occurrence of peeling off could not be realized.

Then, Examples when a surfactant is used will be explained.

(Preparation of Acryl-Based Polymer (A))

A four-neck flask equipped with a stirring wing, a thermometer, a nitrogen gas introducing tube, and a condenser was charged with 200 parts by weight of 2-ethylhexyl acrylate, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for 6 hours while maintaining a liquid temperature in a flask at around 65° C., to prepare a solution (40% by weight) of an acryl-based polymer (A). This acryl-based polymer (A) had Tg=−68° C., a weight average molecular weight of 550 thousands, and an acid value of 0.0.

<Preparation of Ionic Liquid (1)>

After a solution obtained by diluting 10 parts by weight of 1-butyl-3-methylpyridinium chloride (manufactured by Wako Pure Chemical Industries, Ltd.) to 20% by weight with distilled water was added to a four-neck flask equipped with a stirring wing, a thermometer and a condenser, a solution obtained by diluting 19 parts by weight of lithium bis(trifluoromethanesulfonyl)imide (manufactured by Kishida Chemical Co., Ltd.) to 20% by weight with distilled water was gradually added while rotating a stirring wing. After addition, stirring was continued at 25° C. for 2 hours, then the system was allowed to stand for 12 hours, and the supernatant was removed to obtain a liquid product.

The resulting liquid product was washed with 200 parts by weight of distilled water three times, and dried for 2 hours under the environment of 110° C. to obtain 20 parts by weight of an ionic liquid (1) which is liquid under 25° C. NMR ($^1$H, $^{13}$C) measurement, FT-IR measurement and XRF measurement of the resulting ionic liquid (1) were performed to identify and confirm that the product is 1-butyl-3-methylpyridinium bis(trifluoromethanesulfonyl)imide.

<Preparation of Antistatic Solution (a)>

A four-neck flask equipped with a stirring wing, a thermometer, and a condenser was charged with 5 parts by weight of the ionic liquid (1), 5 parts by weight of a nonionic reactive surfactant (ADEKA REASOAP NE-10 manufactured by Asahi Denka Co., Ltd.), and 90 parts by weight of ethyl acetate, mixing and stirring were performed for 30 minutes while maintaining a liquid temperature in a flask at around room temperature (25° C.), to prepare an antistatic agent solution (a) (10% by weight).

(Antistatic Agent Solution (b))

A four-neck flask equipped with a stirring wing, a thermometer, and a condenser was charged with 5 parts by weight of N,N-diethyl-N-methyl-N-(2-methoxyethyl)ammonium bis(trifluoromethanesulfonyl)imide (manufactured by Kanto Kagaku; liquid at 25° C.), 5 parts by weight of a nonionic reactive surfactant (ADEKA REASOAP ER-10 manufactured by Asahi Denka Co., Ltd.), and 90 parts by weight of ethyl acetate, mixing and stirring were performed for 30 minutes while maintaining a liquid temperature in a flask at a room temperature (25° C.), to prepare an antistatic agent solution (b) (10% by weight).

(Antistatic Agent Solution (c))

A four-neck flask equipped with a stirring wing, a thermometer and a condenser was charged with 5 parts by weight of N,N-diethyl-N-methyl-N-(2-methoxyethyl)ammonium bis(trifluoromethanesulfonyl)imide (manufactured by Kanto Kagaku; liquid at 25° C.), 5 parts by weight of a nonionic reactive surfactant (Emulgen 120 manufactured by Kao Corporation), and 90 parts by weight of ethyl acetate, and mixing and stirring were performed for 30 minutes while maintaining a liquid temperature in a flask at around room temperature (25° C.), to prepare an antistatic agent solution (c) (10% by weight).

(Antistatic Agent Solution (d))

A four-neck flask equipped with a stirring wing, a thermometer and a condenser was charged with 5 parts by weight of N,N-diethyl-N-methyl-N-(2-methoxyethyl)ammonium bis(trifluoromethanesulfonyl)imide (manufactured by Kanto Kagaku; liquid at 25° C.), 5 parts by weight of a nonionic reactive surfactant (Noigen EA130T manufactured by Dai-ichi Kogyo Seiyaku Co., Ltd.), and 90 parts by weight of ethyl acetate, and mixing and stirring were performed for 30 minutes while maintaining a liquid temperature in a flask at around room temperature (25° C.), to prepare an antistatic agent solution (d) (10% by weight).

(Antistatic Agent Solution (e))

A four-neck flask equipped with a stirring wing, a thermometer and a condenser was charged with 5 parts by weight of the ionic liquid (1), 5 parts by weight of a polypropylene glycol-polyethylene glycol-polypropylene glycol block copolymer (number average molecular weight 2000, ethylene glycol rate 50 wt %), and 90 parts by weight of ethyl acetate, mixing and stirring were performed for 30 minutes while maintaining a liquid temperature at around room temperature (25° C.), to prepare an antistatic agent solution (e) (10% by weight).

(Antistatic Agent Solution (f))

A four-neck flask equipped with a stirring wing, a thermometer and a condenser was charged with 5 parts by eight of N,N-diethyl-N-methyl-N-(2-methoxyethyl)ammonium bis(trifluoromethanesulfonyl)imide (manufactured by Kanto Kagaku; liquid at 25° C.), 5 parts by weight of a polypropylene glycol-polyethylene glycol-polypropylene glycol block copolymer (number average molecular weight 2000, ethylene glycol rate 50% by weight), and 90 parts by weight of ethyl acetate, and mixing and stirring were performed for 30 minutes while maintaining a liquid temperature in a flask at around room temperature (25° C.), to prepare an antistatic agent solution (f) (10% by weight).

(Antistatic Agent Solution (g))

A four-neck flask equipped with a stirring wing, a thermometer and a condenser was charged with 0.1 part by weight of lithium iodide, 9.9 parts by weight of polypropylene glycol (number average molecular weight 2000, diol type) and 90 parts by weight of ethyl acetate, and mixing and stirring were performed for 2 hours while maintaining a liquid temperature in a flask at around 80° C., to prepare an antistatic agent solution (g) (10% by weight).

(Antistatic Agent Solution (h))

A four-neck flask equipped with a stirring wing, a thermometer, and a condenser was charged with 5 parts by weight of an alicyclic amine-based ionic liquid (IL-A1 manufactured by KOEI CHEMICAL CO., LTD.; liquid at 25° C.), 5 parts by weight of a nonionic reactive surfactant (ADEKA REASOAP ER-10 manufactured by Asahi Denka Co., Ltd.), and 90 parts by weight of ethyl acetate, and mixing and stirring were performed for 30 minutes while maintaining a liquid temperature in a flask at around room temperature (25° C.), to prepare an antistatic agent solution (h) (10% by weight).

(Antistatic Agent Solution (i))

A four-neck flask equipped with a stirring wing, a thermometer, and a condenser was charged with 5 parts by weight of 1-ethyl-3-methylimidazolium (trifluoromethanesulfonyl)trifluoroacetamide (EMI-TSAC manufactured by Tokuyama corp.; liquid at 25° C.), 5 parts by weight of a nonionic reactive surfactant (ADEKA REASOAP ER-10 manufactured by Asahi Denka Co., Ltd.), and 90 parts by weight of ethyl acetate, and mixing and stirring were performed for 30 minutes while maintaining a liquid temperature in a flask at around room temperature (25° C.), to prepare an antistatic agent solution (i) (10% by weight).

(Antistatic Agent Solution (j))

A four-neck flask equipped with a stirring wing, a thermometer and a condenser was charged with 5 parts by weight an alicyclic ionic liquid (IL-C1 manufactured by KOEI CHEMICAL CO., LTD.; liquid at 25° C.), 5 parts by weight of a nonionic reactive surfactant (ADEKA REASOAP ER-10 manufactured by Asahi Denka Co., Ltd.), and 90 parts by weight of ethyl acetate, and mixing and stirring were performed for about 1 hour under a liquid temperature in a flask of 25° C., to prepare an antistatic agent solution 0) (10% by weight).

(Antistatic Agent Solution (k))

A four-neck flask equipped with a stirring wing, a thermometer, and a condenser was charged with 5 parts by weight of an alicyclic ionic liquid (IL-C1 manufactured by KOEI CHEMICAL CO., LTD.; liquid at 25° C.), 5 parts by weight of a nonionic surfactant (Noigen XL-100 manufactured by Dai-ichi Kogyo Seiyaku Co., Ltd.), and 90 parts by weight of ethyl acetate, and mixing and stirring were performed for about 1 hour under a liquid temperature in a flask of 25° C., to prepare an antistatic agent solution (k) (10% by weight).

(Antistatic Agent Solution (l))

A four-neck flask equipped with a stirring wing, a thermometer, and a condenser was charged with 5 parts by weight of an alicyclic ionic liquid (IL-C3 manufactured by KOEI CHEMICAL CO., LTD.; liquid at 25° C.), 5 parts by weight of a nonionic reactive surfactant (ADEKA REASOAP ER-10 manufactured by Asahi Denka Co., Ltd.), and 90 parts by weight of ethyl acetate, and mixing and stirring were performed for about 1 hour under a liquid temperature in a flask of 25° C., to prepare an antistatic agent solution (1) (10% by weight).

(Preparation of Antistatic-Treated Film)

An antistatic agent solution was prepared by diluting 10 parts by weight of an antistatic agent (Microsolver RMd-142 manufactured by Solvex; a main component is tin oxide and a polyester resin) with a mixed solvent consisting of 30 parts by weight of water and 70 parts by weight of methanol. The resulting antistatic agent solution was coated on a polyethylene terephthalate (PET) film (thickness 38 μm) using a Meyer bar, and this was dried at 130° C. for 1 minute to remove a solvent, to form an antistatic layer (thickness 0.2 μm), thereby, an antistatic-treated film was prepared.

Example 2-1

(Preparation of Pressure-Sensitive Adhesive Composition)

A solution (40% by weight) of the acryl-based polymer (A) was diluted to 20% by weight with ethyl acetate, to 100 parts by weight of this solution were added 1.4 parts by weight of the antistatic agent solution (a) (10% by weight), 0.6 part by weight of an isocyanurate entity of hexamethylene diisocyanate (Coronate HX manufactured by Nippon Polyurethane Industry Co., Ltd.), and 0.4 part by weight of dibutyltin dilaurate (1 weight % ethyl acetate solution) as a crosslinking catalyst, and mixing and stirring were performed for about 1 minute at a room temperature (25° C.), to prepare an acryl pressure-sensitive adhesive solution (1).

(Preparation of Pressure-Sensitive Adhesive Sheet)

The acryl pressure-sensitive adhesive solution (1) was coated on a side opposite to an antistatic-treated side of the antistatic-treated film, and this was heated at 110° C. for 3 minutes to form a pressure-sensitive adhesive layer of a thickness of 20 μm. Then, a silicone-treated side of a polyethylene terephthalate film of a thickness of 25 μm, having one silicone-treated side was applied to a surface of the pressure-sensitive adhesive layer to prepare a pressure-sensitive adhesive sheet.

Example 2-2

(Preparation of Pressure-Sensitive Adhesive Composition)

According to the same manner as that of Example 2-1 except that 2 parts by weight of the antistatic agent solution (a) (10% by weight) was used in place of 1.4 parts by weight of the antistatic agent solution (a), an acryl pressure-sensitive adhesive solution (2) was prepared.

(Preparation of Pressure-Sensitive Adhesive Sheet)

According to the same manner as that of Example 2-1 except that the acryl pressure-sensitive adhesive solution (2) was used in place of the acryl pressure-sensitive adhesive solution (1), a pressure-sensitive adhesive sheet was prepared.

Example 2-3

(Preparation of Pressure-Sensitive Adhesive Composition)

According to the same manner as that of Example 2-1 except that 1 part by weight of the antistatic agent solution (b) (10% by weight) was used in place of 1.4 parts by weight of the antistatic agent solution (a), an acryl pressure-sensitive adhesive solution (3) was prepared.

(Preparation of Pressure-Sensitive Adhesive Sheet)

According to the same manner as that of Example 2-1 except that the acryl pressure-sensitive adhesive solution (3) was used in place of the acryl pressure-sensitive adhesive solution (1), a pressure-sensitive adhesive sheet was prepared.

Example 2-4

(Preparation of Pressure-Sensitive Adhesive Composition)

According to the same manner as that of Example 2-1 except that 1 part by weight of the antistatic agent solution (c) (10% by weight) was used in place of 1.4 parts by weight of the antistatic agent solution (a), an acryl pressure-sensitive adhesive solution (4) was prepared.

(Preparation of Pressure-Sensitive Adhesive Sheet)

According to the same manner as that of Example 2-1 except that the acryl pressure-sensitive adhesive solution (4) was used in place of the acryl pressure-sensitive adhesive solution (1), a pressure-sensitive adhesive sheet was prepared.

Example 2-5

(Preparation of Pressure-Sensitive Adhesive Composition)

According to the same manner as that of Example 2-1 except that 1 part by weight of the antistatic agent solution (d) (10% by weight) was used in place of 1.4 parts by weight of the antistatic agent solution (a), an acryl pressure-sensitive adhesive solution (5) was prepared.

(Preparation of Pressure-Sensitive Adhesive Sheet)

According to the same manner as that of Example 2-1 except that the acryl pressure-sensitive adhesive solution (5) was used in place of the acryl pressure-sensitive adhesive solution (1).

Example 2-6

(Preparation of Pressure-Sensitive Adhesive Composition)

A solution (40% by weight) of the acryl-based polymer (A) was diluted to 20% by weight with ethyl acetate, to 100 parts by weight of this solution were added 1.6 parts by weight of the antistatic agent solution (h) (10% by weight), 0.3 part by weight of an isocyanurate entity of hexamethylene diisocyanate (Coronate HX manufactured by Nippon Polyurethane Industry Co., Ltd.), and 0.4 part by weight of dibutyltin dilaurate (1 weight % ethyl acetate solution) as a crosslinking catalyst, and mixing and stirring were performed for about 1 minute at a room temperature (25° C.) to prepare an acryl pressure-sensitive adhesive solution (6).

(Preparation of Pressure-Sensitive Adhesive Sheet)

According to the same manner as that of Example 2-1 except that the acryl pressure-sensitive adhesive solution (6) was used in place of the acryl pressure-sensitive adhesive solution (1), a pressure-sensitive adhesive sheet was prepared.

Example 2-7

(Preparation of Pressure-Sensitive Adhesive Composition)

A solution (40% by weight) of the acryl-based polymer (A) was diluted to 20% by weight with ethyl acetate, to 100 parts by weight of this solution were added 1.0 part by weight of the antistatic agent solution (i) (10% by weight), 0.3 part by weight of an isocyanurate entity of hexamethylene diisocyanate (Coronate HX manufactured by Nippon Polyurethane Industry Co., Ltd.) and 0.4 part by weight of dibutyltin dilaurate (1 weight % ethyl acetate solution) as a crosslinking catalyst, and mixing and stirring were performed for about 1 minute under a room temperature (25° C.) to prepare an acryl pressure-sensitive adhesive solution (7).

(Preparation of Pressure-Sensitive Adhesive Sheet)

According to the same manner as that of Example 2-1 except that the acryl pressure-sensitive adhesive solution (7) was used in place of the acryl pressure-sensitive adhesive solution (1), a pressure-sensitive adhesive sheet was prepared.

Example 2-8

(Preparation of Pressure-Sensitive Adhesive Composition)

According to the same manner as that of Example 2-1 except that 0.002 parts by weight of lithium iodide was charged upon preparation of an antistatic agent solution (a) in Example 2-1, an acryl pressure-sensitive adhesive solution (1') was prepared.

(Preparation of Pressure-Sensitive Adhesive Sheet)

According to the same manner as that of Example 2-1 except that the acryl pressure-sensitive adhesive solution (1') was used in place of the acryl pressure-sensitive adhesive solution (1), a pressure-sensitive adhesive sheet was prepared.

Example 2-9

(Preparation of Pressure-Sensitive Adhesive Composition)

A solution (40% by weight) of the acryl-based polymer (A) was diluted to 20% by weight with ethyl acetate, to 100 parts by weight of this solution were added 1 part by weight of the antistatic agent solution (j) (10% by weight ethyl acetate solution), 0.35 part by weight of an isocyanurate entity of hexamethylene diisocyanate (Coronate HX manufactured by Nippon Polyurethane Industry Co., Ltd.), and 0.4 part by weight of dibutyltin dilaurate (1 weight % ethyl acetate solution) as a crosslinking catalyst, and mixing and stirring were performed at 25° C. for 1 minute to prepare an acryl pressure-sensitive adhesive solution (j).

(Preparation of Pressure-Sensitive Adhesive Sheet)

According to the same manner as that of Example 2-1 except that the acryl pressure-sensitive adhesive solution (j) was used in place of the acryl pressure-sensitive adhesive solution (1), a pressure-sensitive adhesive sheet was prepared.

Example 2-10

(Preparation of Pressure-Sensitive Adhesive Composition)

According to the same manner as that of Example 2-9 except that 1 part by weight of the antistatic agent solution (k) (10 weight % ethyl acetate solution) was used in place of 1 part by weight of the antistatic agent solution (j) (10 weight % ethyl acetate solution), an acryl pressure-sensitive adhesive solution (2') was prepared.

(Preparation of Pressure-Sensitive Adhesive Sheet)

According to the same manner as that of Example 2-1 except that the acryl pressure-sensitive adhesive solution (2') was used in place of the acryl pressure-sensitive adhesive solution (1), a pressure-sensitive adhesive sheet was prepared.

Example 2-11

(Preparation of Pressure-Sensitive Adhesive Composition)

According to the same manner as that of Example 2-9 except that 1 part by weight of the antistatic agent solution (l) (10 weight % ethyl acetate solution) was used in place of 1 part by weight of the antistatic agent solution (j) (10 weight % ethyl acetate solution), an acryl pressure-sensitive adhesive solution (3') was prepared.

(Preparation of Pressure-Sensitive Adhesive Sheet)

According to the same manner as that of Example 2-1 except that the acryl pressure-sensitive adhesive solution (3') was used in place of the acryl pressure-sensitive adhesive solution (1), a pressure-sensitive adhesive sheet was prepared.

Comparative Example 2-1

(Preparation of Pressure-Sensitive Adhesive Composition)

According to the same manner as that of Example 2-1 except that 1.4 parts by weight of the antistatic agent solution (e) (10% by weight) was used in place of 1.4 parts by weight of the antistatic agent solution (a), an acryl pressure-sensitive adhesive solution (8) was prepared.

(Preparation of Pressure-Sensitive Adhesive Sheet)

According to the same manner as that of Example 2-1 except that the acryl pressure-sensitive adhesive solution (8) was used in place of the acryl pressure-sensitive adhesive solution (1), a pressure-sensitive adhesive sheet was prepared.

Comparative Example 2-2

(Preparation of Pressure-Sensitive Adhesive Composition)

According to the same manner as that of Example 2-1 except that 1 part by weight of the antistatic agent solution (f) (10% by weight) was used in place of 1.4 parts by weight of the antistatic agent solution (a), an acryl pressure-sensitive adhesive solution (9) was prepared.

(Preparation of Pressure-Sensitive Adhesive Sheet)

According to the same manner as that of Example 2-1 except that the acryl pressure-sensitive adhesive solution (9) was used in place of the acryl pressure-sensitive adhesive solution (1), a pressure-sensitive adhesive sheet was prepared.

Comparative Example 2-3

(Preparation of Pressure-Sensitive Adhesive Composition)
According to the same manner as that of Example 2-1 except that 0.2 part by weight of a nonionic reactive surfactant (ADEKA REASOAP NE-10 manufactured by Asahi Denka Co., Ltd.) was used in place of 1.4 parts by weight of the antistatic agent solution (a), an acryl pressure-sensitive adhesive solution (10) was prepared.

(Preparation of Pressure-Sensitive Adhesive Sheet)
According to the same manner as that of Example 2-1 except that the acryl pressure-sensitive adhesive solution (10) was used in place of the acryl pressure-sensitive adhesive solution (1), a pressure-sensitive adhesive sheet was prepared.

Comparative Example 2-4

(Preparation of Pressure-Sensitive Adhesive Composition)
According to the same manner as that of Example 2-1 except that 14 parts by weight of the antistatic agent solution (g) (10% by weight) was used in place of 1.4 parts by weight of the antistatic agent solution (a), an acryl pressure-sensitive adhesive solution (11) was prepared.

(Preparation of Pressure-Sensitive Adhesive Sheet)
According to the same manner as that of Example 2-1 except that the acryl pressure-sensitive adhesive solution (11) was used in place of the acryl pressure-sensitive adhesive solution (1), a pressure-sensitive adhesive sheet was prepared.

Comparative Example 2-5

(Preparation of Pressure-Sensitive Adhesive Composition)
According to the same manner as that of Example 2-1 except that 2.0 parts by weight of a dialkylsulfosuccinic acid ester sodium salt (Neocol P manufactured by Dai-ichi Kogyo Seiyaku Co., Ltd.) which is an anionic surfactant was used in place of 1.4 parts by weight of the antistatic agent solution (a), 1 part by weight of trimethylolpropane/tolylene diisocyanate trimer adduct (Coronate L manufactured by Nippon Polyurethane Industry Co., Ltd.; 75 weight % ethyl acetate solution) was used as a crosslinking agent, and 0.6 part by weight of dibutyltin dilaurate (1 weight % ethyl acetate solution) was used as a crosslinking catalyst, an acryl pressure-sensitive adhesive solution (12) was prepared.

(Preparation of Pressure-Sensitive Adhesive Sheet)
According to the same manner as that of Example 2-1 except that the acryl pressure-sensitive adhesive solution (12) was used in place of the acryl pressure-sensitive adhesive solution (1), a pressure-sensitive adhesive sheet was prepared.

Regarding pressure-sensitive adhesive sheets obtained in the aforementioned Examples, and Comparative Examples, a peeling electrification voltage, staining property and an adhesive strength were assessed by the following procedure.

<Measurement of Peeling Electrification Voltage for Ex. 2-1 to 2-8 and Comp. Ex. 2-1 to 2-5>

A pressure-sensitive adhesive sheet was cut into a size of a width 70 mm and a length 130 mm, a separator was peeled, and this was adhered to a surface of a polarizing plate (SEG1425WVAGS2B manufactured by Nitto Denko, width: 70 mm, length: 100 mm) which had been applied to a pre-electricity-removed acryl plate (Acrylite manufactured by Mitsubishi Rayon, thickness: 1 mm, width: 70 mm, length: 100 mm), with a hand roller, so that one end was protruded by 30 mm.

After allowing to stand for one day under the environment of 23° C.×50% RH, a sample was set at a prescribed position as shown in FIG. 1. One end protruding by 30 mm was fixed at an automatic winding machine, and the sample was peeled at a peeling angle of 150° and a peeling rate of 10 m/min. A voltage of a polarizing plate surface which occurred thereupon was measured with an electrostatic voltmeter (KSD-0103 manufactured by Kasuga Denki, Inc.) fixed at a central position in a length direction of a sample. Measurement was performed under the environment of 23° C.×50% RH.

<Measurement of Peeling Electrification Voltage for Ex. 2-9 to 2-11>

A pressure-sensitive adhesive sheet was cut into a size of a width 70 mm and a length 130 mm, a separator was peeled, and this was pressure-adhered to a surface of a polarizing plate (SEG1425EWVAGS2B[antiglare type] or SEG1425EWV[non-antiglare type] each manufactured by Nitto Denko, width: 70 mm, length: 100 mm) which had been applied to a pre-electricity-removed acryl plate (Acrylite manufactured by Mitsubishi Rayon, thickness: 1 mm, width: 70 mm, length: 100 mm), with a hand roller, so that one end was protruded by 30 mm.

After allowing to stand for one day under the environment of 23° C.×50% RH, a sample was set at a prescribed position as shown in FIG. 1. One end protruding by 30 mm was fixed at an automatic winding machine, and the sample was peeled at a peeling angle of 150° and a peeling rate of 10 m/min. A voltage of a polarizing plate surface which occurred thereupon was measured with an electrostatic voltmeter (KSD-0103 manufactured by Kasuga Denki, Inc.) fixed at a prescribed position. Measurement was performed under the environment of 23° C.×50% RH.

<Assessment of Staining Property for Ex. 2-1 to 2-8 and Comp. Ex. 2-1 to 2-5>

A pressure-sensitive adhesive sheet was cut into a size of a width 50 mm and a length 80 mm, a separator was peeled, and this was adhered to a polarizing plate (SEG1425WVAGS2B manufactured by Nitto Denko, a width: 70 mm and a length: 100 mm) with a hand roller to prepare a sample for assessment.

A sample for assessment was allowed to stand for 24 hours under the environment of 50° C.×92% RH, and for 2 hours under the environment of 23° C.×50% RH, a pressure-sensitive adhesive sheet was peeled from an adherend with a hand, and the state of staining of an adherend surface was observed with naked eyes. Assessment criteria are as follows:

Case where stain was not perceived: ○
Case where stain was perceived: x

<Assessment of Staining Property for Ex. 2-9 to 2-11>

A pressure-sensitive adhesive sheet was cut into a size of a width 100 mm and a length 100 mm and this was adhered to a polarizing plate (SEG1425EWVAGS2B manufactured by Nitto Denko, a width: 180 mm and a length: 250 mm) which had been applied to an acryl plate (CLAREX(Black) manufactured by Nitto Denko Resin Industry, thickness: 1 mm, width: 180 mm, length: 250 mm), with a hand roller to prepare a sample for assessment.

This sample for assessment was allowed to stand for 1 month under the environment of 23° C.×50% RH, a pressure-sensitive adhesive sheet was peeled from an adherend with a hand, and the stain state of an adherend surface was observed with naked eyes. Assessment criteria are as follows:

Case where stain was not perceived: ○
Case where stain was perceived: x

<Adhesive Strength Measurement for Ex. 2-1 to 2-8 and Comp. Ex. 2-1 to 2-5>

A pressure-sensitive adhesive sheet was cut into a width 25 mm and a length 100 mm, a separator was peeled, and this was laminated on a polarizing plate (SEG1425DU manufactured by Nitto Denko, width: 70 mm and length: 100 mm), to prepare a sample for assessment.

After lamination, after allowing to stand for 30 minutes under the environment of 23° C.×50% RH, an adhesive strength when the sample was peeled at a peeling rate of 10 m/min and a peeling angle of 180° with a universal tensile tester was measured. Measurement was performed under the environment of 23° C.×50% RH.

<Adhesive Strength Measurement for Ex. 2-9 to 2-11>

A triacetylcellulose film [Fujitack manufactured by Fuji Photo Film Co., Ltd.] having a thickness of 90 μm was cut into a width 70 mm and a length 100 mm, and this was immersed in an aqueous sodium hydroxide solution (10% by weight) at 60° C. for 1 minute, and washed with distilled water to prepare an adherend.

After the adherend was allowed to stand for 24 hours under the environment of 23° C.×50% RH, a pressure-sensitive adhesive sheet which had been cut into a size of a width 25 mm and a length 100 mm was laminated thereon at a pressure of 0.25 MPa to prepare a sample for assessment. After lamination, the sample was allowed to stand for 30 minutes under the environment of 23° C.×50% RH, and an adhesive strength when peeled at a peeling rate of 10 m/min and a peeling angle of 180° was measured with a universal tensile tester. Measurement was performed under the environment of 23° C.×50% RH.

The above results are shown in Tables 2-1 and 2-2.

TABLE 2-1

|  | Peeling electrification voltage [kV] | Staining property [—] | Adhesive strength [N/25 mm] |
|---|---|---|---|
| Example 2-1 | −0.4 | ○ | 0.9 |
| Example 2-2 | −0.1 | ○ | 1.1 |
| Example 2-3 | −0.1 | ○ | 0.8 |
| Example 2-4 | −0.2 | ○ | 0.9 |
| Example 2-5 | −0.1 | ○ | 0.9 |
| Example 2-6 | 0.0 | ○ | 1.5 |
| Example 2-7 | 0.0 | ○ | 0.9 |
| Example 2-8 | 0.0 | ○ | 0.8 |
| Comparative Example 2-1 | −0.2 | x | 0.6 |
| Comparative Example 2-2 | 0.0 | x | 0.4 |
| Comparative Example 2-3 | −1.4 | ○ | 1.0 |
| Comparative Example 2-4 | −0.2 | x | 0.4 |
| Comparative Example 2-5 | 0.0 | x | 0.4 |

TABLE 2-2

|  | Peeling electrification voltage [kV] | | Staining property [—] | Adhesive strength [N/25 mm] |
|---|---|---|---|---|
|  | SEG1425EWVAGS2B | SEG1425EWV | | |
| Example 2-9 | 0.0 | −0.1 | ○ | 1.0 |
| Example 2-10 | 0.0 | −0.2 | ○ | 0.9 |
| Example 2-11 | 0.0 | 0.0 | ○ | 1.2 |

As apparent from the results of Tables 2-1 and 2-2, it was made clear that, when the pressure-sensitive adhesive composition prepared according to the present invention (Examples 2-1 to 2-11) is used, a peeling electrification voltage on a polarizing plate was suppressed, and stain on a polarizing plate did not occur in all Examples.

To the contrary, when an antistatic agent consisting of an ionic liquid and polyether polyol is used (Comparative Examples 2-1 to 2-2), when an antistatic agent consisting of an alkali metal salt and polyether polyol is used (Comparative Example 2-4), and when an ionic liquid is not contained, and only a surfactant is contained (Comparative Example 2-5), the result is that a peeling electrification voltage on a polarizing plate was suppressed low, but occurrence of stain on a polarizing plate was perceived in all cases. In addition, when a surfactant is used alone and an amount thereof is reduced (Comparative Example 2-3), occurrence of stain on a polarizing plate is not perceived, but a peeling electrification voltage on a polarizing plate is high. Like this, in pressure-sensitive adhesive sheets of Comparative Examples 2-1 to 2-5, in all cases, both of suppression of a peeling electrification voltage on a polarizing plate, and suppression of occurrence of stain could not be realized.

What is claimed is:

1. A pressure-sensitive adhesive composition, which comprises an ionic liquid, a polymer containing an acid functional group and having a glass transition temperature Tg of 0° C. or lower as a base polymer, and an ethylene oxide group-containing compound and/or a surfactant, wherein the acid value of the polymer is 1 or less.

2. The pressure-sensitive adhesive composition according to claim 1, wherein the ionic liquid is any one or more kinds of a nitrogen-containing onium salt, a sulfur-containing onium salt, and a phosphorus-containing onium salt.

3. A pressure-sensitive adhesive composition, which comprises an ionic liquid, a polymer having a glass transition temperature Tg of 0° C. or lower as a base polymer, and an ethylene oxide group-containing compound and/or a surfactant, wherein the acid value of the polymer is 1 or less, wherein the ionic liquid contains one or more kinds of cations represented by the following general formulas (A) to (D), wherein:

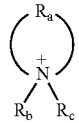

(A)

-continued

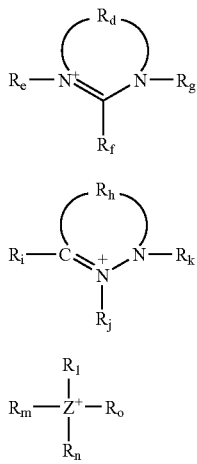

$R_a$ in the formula (A) represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present;

$R_d$ in the formula (B) represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom;

$R_h$ in the formula (C) represents a hydrocarbon group of a carbon number of 2 to 20, and may contain a hetero atom, and $R_i$, $R_j$ and $R_k$ are the same or different, represent hydrogen or a hydrocarbon group of a carbon number of 1 to 16, and may contain a hetero atom;

Z in the formula (D) represents a nitrogen atom, a sulfur atom or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present.

4. The pressure-sensitive adhesive composition according to claim 1, wherein the ethylene oxide group-containing compound is a surfactant having an ethylene oxide group.

5. The pressure-sensitive adhesive composition according to claim 1, wherein the polymer having a glass transition temperature Tg of 0° C. or lower is an acryl-based polymer containing, as a main component, one or more kinds of acrylate and/or methacrylate having an alkyl group of a carbon number of 1 to 14.

6. A pressure-sensitive adhesive layer, wherein a pressure-sensitive adhesive composition, which comprises an ionic liquid, a polymer having a glass transition temperature Tg of 0° C. or lower as a base polymer, and an ethylene oxide group-containing compound and/or a surfactant, is crosslinked, wherein the acid value of the polymer is 1 or less.

7. A pressure-sensitive adhesive sheet, comprising a pressure-sensitive adhesive layer containing a pressure-sensitive adhesive composition as defined in any one of claims 1 to 5 on one side or both sides of a support.

8. A surface protecting film, comprising a pressure-sensitive adhesive layer containing a pressure-sensitive adhesive composition as defined in any one of claims 1 to 5 on one side or both sides of a support.

9. A pressure-sensitive adhesive layer, wherein the pressure-sensitive adhesive composition as defined in claim 2 is crosslinked.

10. A pressure-sensitive adhesive layer, wherein the pressure-sensitive adhesive composition as defined in claim 3 is crosslinked.

11. A pressure-sensitive adhesive layer, wherein the pressure-sensitive adhesive composition as defined in claim 4 is crosslinked.

12. A pressure-sensitive adhesive layer, wherein the pressure-sensitive adhesive composition as defined in claim 5 is crosslinked.

13. The pressure-sensitive adhesive composition of claim 1, wherein the amount of acid functional group in said polymer is 3.7% or less by weight acid functional group relative to a total amount of monomers in said polymer.

14. The pressure-sensitive adhesive composition of claim 3, wherein the polymer contains an acid functional group, and the amount of acid functional group in said polymer is 3.7% or less by weight acid functional group relative to a total amount of monomers in said polymer.

* * * * *

UNITED STATES PATENT AND TRADEMARK OFFICE
CERTIFICATE OF CORRECTION

PATENT NO. : 7,491,758 B2
APPLICATION NO. : 11/141590
DATED : February 17, 2009
INVENTOR(S) : Tatsumi Amano et al.

It is certified that error appears in the above-identified patent and that said Letters Patent is hereby corrected as shown below:

Title Page, Item (56), under U.S. Patent Documents, please delete "6,372,829 B1 4/2002 Lamanna et al." and insert --6,372,829,B1* 4/2002 Lamanna et al. 524/99--, therefor.

Title Page on Page 2, Item (56), under Other Publications, please delete "EP050016102," and insert --EP05016102,--, therefor.

Title Page on Page 2, Item (56), under Other Publications, please delete "in" and insert --on--, therefor.

At Column 3, Line 54, please delete "obtained" and insert --obtained.--, therefor.

At Column 3, Line 58, please delete "methacylate" and insert --methacrylate--, therefor.

At Column 7, Line 10, please delete "methoxyethyl) ammonium" and insert --methoxyethyl)ammonium--, therefor.

At Column 7, Line 13, please delete "pentylamonium" and insert --pentylammonium--, therefor.

At Column 7, Line 45, please delete "hexylamonium" and insert --hexylammonium--, therefor.

At Column 7, Line 59, please delete "pentylamonium" and insert --pentylammonium--, therefor.

At Column 8, Line 18, please delete "methylpyridiinium" and insert --methylpyridinium--, therefor.

At Column 9, Line 49, please delete "bis(trifluoromethanesulfonyl)imide" and insert --bis(trifluoromethanesulfonyl)imide,--, therefor.

At Column 10, Lines 5-6, please delete "glydicyltrimethylammonium" and insert --glycidyltrimethylammonium--, therefor.

At Column 11, Line 67, please delete "(3)" and insert --(9)--, therefor.

At Column 12, Lines 46-47, please delete "$(CF_3SO_2)_2NH, (CF_3SO_2)_2NH,$" and insert --$(CF_3SO_2)_2NH,$--, therefor.

At Column 13, Line 22, please delete "polypropyelene golycol," and insert --polypropylene glycol,--, therefor.

At Column 15, Line 8, please delete "aminonic" and insert --anionic--, therefor.

At Column 17, Lines 50-51 (approximately), please delete "N,N -dimethylmethacrylamide," and insert --N,N-dimethylmethacrylamide,--, therefor.

At Column 17, Lines 54-55, please delete "N,N - dimethylaminopropylmethacrylamide." and insert --N,N-dimethylaminopropylmethacrylamide.--, therefor.

At Column 19, Line 6, please delete "m -xylenediamine" and insert --m-xylenediamine--, therefor.

At Column 19, Line 15, please delete "Sogoyakko)" and insert --Sogo Yakko)--, therefor.

At Column 20, Line 18, please delete "p -benzoin" and insert --p-benzoin--, therefor.

At Column 20, Line 26 (approximately), please delete "p -dimethylaminobenzophenone," and insert --p-dimethylaminobenzophenone,--, therefor.

At Column 21, Line 55, please delete "ethylene.propylene" and insert --ehylene·propylene--, therefor.

At Column 21, Line 56, please delete "ethylene.1-butene" and insert --ethylene·1-butene--, therefor.

At Column 21, Line 56, please delete "ethylene-vinyl" and insert --ethylene·vinyl--, therefor.

At Column 21, Line 57, please delete "ethylene.ethyl" and insert --ethylene·ethyl--, therefor.

At Column 21, Line 58, please delete "ethylene.vinyl" and insert --ethylene· vinyl--, therefor.

At Column 22, Line 24, please delete "tartiary" and insert --tertiary--, therefor.

At Column 23, Line 51, please delete "1000 Á," and insert --10000 Á--, therefor.

At Column 27, Line 24, please delete "N,N -diethyl" and insert --N,N-diethyl--, therefor.

At Column 27, Line 41, please delete "N,N -diethyl" and insert --N,N-diethyl--, therefor.

At Column 27, Line 58, please delete "1-butyl -3" and insert --1-butyl-3--, therefor.

At Column 28, Line 7, please delete "1-butyl -3" and insert --1-butyl-3--, therefor.

At Column 28, Line 24, please delete "1-butyl -3" and insert --1-butyl-3--, therefor.

At Column 28, Line 53, please delete "N,N -diethyl" and insert --N,N-diethyl--, therefor.

At Column 33, Line 34, please delete "1500" and insert --150°--, therefor.

At Column 37, Line 2, please delete "0)" and insert --(j)--, therefor.

At Column 40, Line 23 (approximately), please delete "(l)" and insert --(1)--, therefor.

At Column 46, Line 11, in Claim 6, please delete "composition ," and insert --composition,--, therefor.

Signed and Sealed this

Sixteenth Day of March, 2010

David J. Kappos
*Director of the United States Patent and Trademark Office*